(12) United States Patent
Files et al.

(10) Patent No.: US 12,634,578 B2
(45) Date of Patent: May 19, 2026

(54) PORTABLE INFORMATION HANDLING SYSTEM MAGNETICALLY ATTACHED CAMERA BATTERY CHARGE MANAGEMENT

(71) Applicant: Dell Products L.P., Round Rock, TX (US)

(72) Inventors: Jace W. Files, Round Rock, TX (US); John Trevor Morrison, Round Rock, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 510 days.

(21) Appl. No.: 18/104,008

(22) Filed: Jan. 31, 2023

(65) Prior Publication Data

US 2024/0259677 A1 Aug. 1, 2024

(51) Int. Cl.
| | |
|---|---|
| *H04N 23/65* | (2023.01) |
| *G06F 1/16* | (2006.01) |
| *H02J 7/70* | (2026.01) |
| *H02J 50/10* | (2016.01) |
| *H02J 50/90* | (2016.01) |
| *H04N 23/51* | (2023.01) |
| *H04N 23/54* | (2023.01) |

(52) U.S. Cl.
CPC .......... *H04N 23/65* (2023.01); *G06F 1/1632* (2013.01); *G06F 1/1686* (2013.01); *H02J 7/731* (2026.01); *H02J 50/10* (2016.02); *H02J 50/90* (2016.02); *H04N 23/51* (2023.01); *H04N 23/54* (2023.01)

(58) Field of Classification Search
CPC ........ H04N 23/65; H04N 23/51; H04N 23/54; G06F 1/1632; G06F 1/1686; H02J 7/0044; H02J 50/10; H02J 50/90
See application file for complete search history.

(56) References Cited

U.S. PATENT DOCUMENTS

| | | | |
|---|---|---|---|
| 6,943,843 | B2 | 9/2005 | Boyden |
| 7,127,163 | B2 | 10/2006 | Lee et al. |
| 7,728,963 | B2 | 6/2010 | Kirschner |
| 7,830,628 | B2 | 11/2010 | Schaefer |
| 8,169,185 | B2 | 5/2012 | Partovi et al. |
| 8,541,975 | B2 | 9/2013 | Park et al. |
| 8,564,544 | B2 | 10/2013 | Jobs et al. |

(Continued)

FOREIGN PATENT DOCUMENTS

| | | |
|---|---|---|
| CN | 109936733 | 6/2019 |
| EP | 3846142 A1 | 7/2021 |
| WO | 2019231642 A1 | 12/2019 |

*Primary Examiner* — Yosef K Laekemariam
(74) *Attorney, Agent, or Firm* — Zagorin Cave LLP; Robert W. Holland

(57) ABSTRACT

An information handling system having a display magnetically couples a peripheral camera to the display with a ferromagnetic material disposed behind only a portion of the display. The peripheral camera rests in a dock to receive a charge and operate on external power, and operates on a battery when not docked. The peripheral camera adjusts a resolution of video streamed based upon whether external power is available, the amount of battery charge when external power is not available, and an anticipated time of video streaming based upon a length of a scheduled video-conference and/or a history of end user videoconference lengths.

16 Claims, 21 Drawing Sheets

(56) References Cited

U.S. PATENT DOCUMENTS

| | | | |
|---|---|---|---|
| 8,639,106 B1 | 1/2014 | Gleason et al. | |
| 9,398,258 B1 | 7/2016 | Sandvik et al. | |
| 9,619,299 B2 * | 4/2017 | Cox | G06N 5/02 |
| 9,628,688 B2 | 4/2017 | Martin et al. | |
| 9,631,767 B2 | 4/2017 | Kilgore | |
| 9,813,599 B1 | 11/2017 | Wang et al. | |
| 10,266,125 B2 | 4/2019 | Wang | |
| 10,491,806 B2 | 11/2019 | Lai et al. | |
| 10,831,093 B1 | 11/2020 | Lablans | |
| 10,951,863 B2 | 3/2021 | Marutani et al. | |
| 11,064,226 B2 * | 7/2021 | Slamka | H04N 7/18 |
| 11,283,982 B2 | 3/2022 | Koci | |
| 11,323,686 B2 | 5/2022 | Sheridan | |
| 11,388,324 B2 | 7/2022 | Okuley | |
| 11,622,067 B2 | 4/2023 | Tan | |
| 11,714,331 B2 | 8/2023 | Wallace | |
| 12,022,187 B2 | 6/2024 | Sasaki | |
| 2003/0058363 A1 | 3/2003 | Boyden et al. | |
| 2004/0090533 A1 | 5/2004 | Dow et al. | |
| 2011/0193935 A1 | 8/2011 | Gorzynski | |
| 2011/0260681 A1 | 10/2011 | Guccione et al. | |
| 2015/0036047 A1 | 2/2015 | Bledsoe | |
| 2016/0181855 A1 | 6/2016 | Muurinen | |
| 2017/0019580 A1 | 1/2017 | Boghosian | |
| 2017/0063141 A1 | 3/2017 | Kim et al. | |
| 2017/0205987 A1 | 7/2017 | Martin et al. | |
| 2018/0013934 A1 | 1/2018 | Germe | |
| 2018/0218656 A1 | 8/2018 | Richards | |
| 2018/0295328 A1 | 10/2018 | Tucker et al. | |
| 2019/0215423 A1 | 7/2019 | Ortiz | |
| 2019/0230259 A1 | 7/2019 | Germe et al. | |
| 2019/0260863 A1 | 8/2019 | Kinouchi | |
| 2019/0353896 A1 | 11/2019 | Kim | |
| 2019/0373152 A1 | 12/2019 | Tan | |
| 2019/0373214 A1 | 12/2019 | Gurr et al. | |
| 2020/0253474 A1 | 8/2020 | Muhsin | |
| 2020/0288045 A1 | 9/2020 | Jeong et al. | |
| 2020/0314299 A1 | 10/2020 | Lkuley | |
| 2020/0329177 A1 | 10/2020 | Greaves | |
| 2021/0046885 A1 | 2/2021 | Jankura | |
| 2021/0099030 A1 | 4/2021 | Walton et al. | |
| 2021/0386219 A1 | 12/2021 | Koci | |
| 2022/0006889 A1 | 1/2022 | Scalisi | |
| 2022/0256063 A1 | 8/2022 | Chen | |
| 2022/0345604 A1 | 10/2022 | Hendren | |
| 2022/0398905 A1 | 12/2022 | Yang | |
| 2022/0407986 A1 | 12/2022 | Ogishita | |
| 2023/0025705 A1 | 1/2023 | Chen | |
| 2023/0045803 A1 | 2/2023 | Wallace | |
| 2023/0047594 A1 | 2/2023 | Wallace | |
| 2023/0080551 A1 | 3/2023 | Gagne-Keats | |
| 2023/0108250 A1 | 4/2023 | Draz et al. | |
| 2023/0188815 A1 | 6/2023 | Tosh et al. | |
| 2024/0073499 A1 | 2/2024 | Vitale | |
| 2024/0106271 A1 | 3/2024 | Hong | |
| 2024/0126350 A1 | 4/2024 | Ki | |
| 2024/0257381 A1 | 8/2024 | Files | |
| 2024/0258813 A1 | 8/2024 | Morrison | |
| 2024/0259655 A1 | 8/2024 | Files | |
| 2024/0259656 A1 | 8/2024 | Files | |
| 2024/0259657 A1 | 8/2024 | Files | |
| 2024/0259677 A1 | 8/2024 | Files | |

* cited by examiner

122

142

146

144

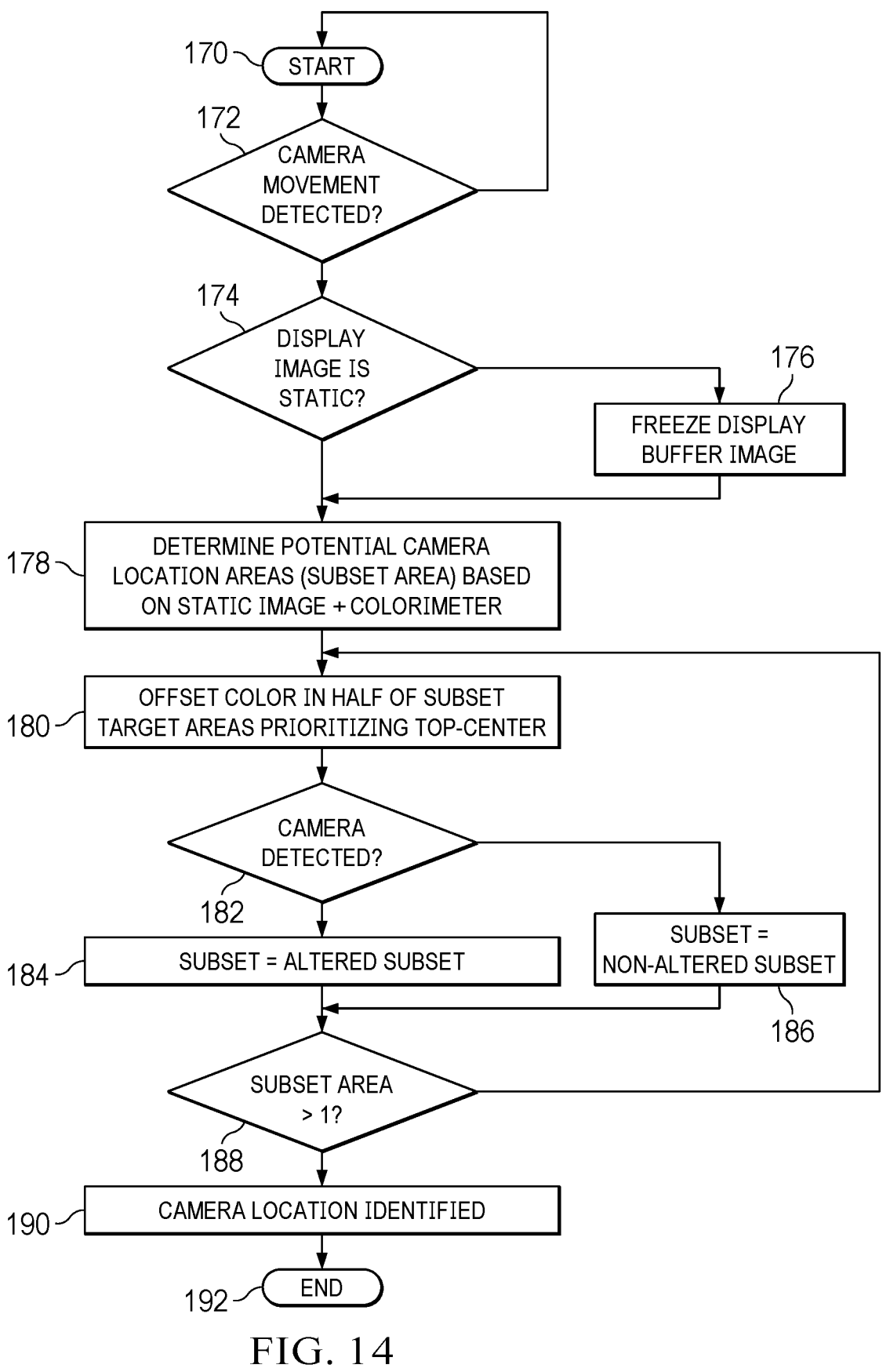

170 — START

172 — CAMERA MOVEMENT DETECTED?

174 — DISPLAY IMAGE IS STATIC?

176 — FREEZE DISPLAY BUFFER IMAGE

178 — DETERMINE POTENTIAL CAMERA LOCATION AREAS (SUBSET AREA) BASED ON STATIC IMAGE + COLORIMETER

180 — OFFSET COLOR IN HALF OF SUBSET TARGET AREAS PRIORITIZING TOP-CENTER

182 — CAMERA DETECTED?

184 — SUBSET = ALTERED SUBSET

186 — SUBSET = NON-ALTERED SUBSET

188 — SUBSET AREA > 1?

190 — CAMERA LOCATION IDENTIFIED

192 — END

FIG. 14

PORTABLE INFORMATION HANDLING SYSTEM MAGNETICALLY ATTACHED CAMERA BATTERY CHARGE MANAGEMENT

BACKGROUND OF THE INVENTION

Field of the Invention

The present invention relates in general to the field of portable information handling systems, and more particularly to a portable information handling system magnetically attached camera battery charge management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often serve as communication devices, such as by supporting videoconferences with an integrated or peripheral camera. For example, portable information handling systems typically integrate a camera in an integrated display bezel of the portable housing that captures visual images in a field of view associated with an end user viewing the integrated display. Integrated cameras offer a convenient tool when an end user is mobile, however integrated cameras tend to have a limited utility due to the thin size of the portable information handling system housing that limits the size of the camera lens. Further, displays integrated in portable housings generally have a limited presentation area that restricts the amount of information displayed during a video conference. For example, a video conference can be a complex interaction with a large number of participants each presented in their own window and participating in an active conversation. In addition, video conferences also often reference shared documents that are presented alongside conference participants.

When possible end users tend to prefer interacting with video conferences through peripheral displays that interface with information handling systems and offer a larger viewing area. A large peripheral display provides an end user with ready access to an entirety of a video conference, such as by showing multiple windows with each window having a conference participant and showing presentations discussed by the participants. Although an end user may rely upon an integrated camera of a portable information handling system to present an image of the end user in the videoconference, often end users prefer to use a peripheral camera associated with a peripheral display that provides better image quality. Some peripheral displays integrate a camera, however, more often a peripheral camera will be used with a peripheral display since the peripheral camera offers room for higher quality camera lens. Typically, a peripheral camera is placed on a bracket coupled to the display and directed towards an area in front of the display where an end user will view the display. Often the brackets can couple at different positions of the display perimeter and can swivel to adjust the camera field of view. In some cases, the cameras can also couple to a stand that rests in front of a display that an end user can move to different locations on a desktop. As video conferences have grown more common and involved more important subject matter, some end users have begun to use high end DLSR and similar cameras, such as to support executive meetings.

One difficulty with the use of peripheral cameras is that they are difficult to place with larger peripheral displays. Coupling a camera to a display perimeter results in an end user viewing a display area away from the camera field of view axis so that other video conference participants receive a visual image of the end user looking away from the camera even though the end user is viewing the video conference. Thus, although a large display viewing area makes a videoconference easier to view, the larger display perimeter increases the angle at which a camera views an end user relative to the end user gaze at a video conference. The result is an unnatural image of the end user presented to the remainder of the videoconference as the end user gazes directly at other participants but has an image captured of the end user looking away from the camera. One solution is to place the camera on a stand in front of the display, however this tends to block the end user's viewing and interfere with desktop surface usage. The difficulties were addressed with a magnetically coupled camera in U.S. patent application Ser. No. 17/550,748 entitled "Camera with Magnetic Attachment to Display Panel," filed Dec. 14, 2021, by Files et al, with a small cylindrical camera with magnets to couple to a peripheral display. A remaining difficulty is that the magnetic coupling tends not to work with portable information handling systems that do not include iron in the housing. Another difficulty is that the small camera size limits the amount of battery available to operate the camera. Another difficulty is that the plastic housing does not dissipate heat from the small form factor, although this is addressed in part by U.S. patent application Ser. No. 17/325,508 entitled "Cylindrical Camera Thermal Shield," filed May 20, 2021, by Goh et al. Another difficulty is managing external illumination at an end user viewing a camera next to a videoconference window since an end user will not want to look directly at a light at the camera front face.

SUMMARY OF THE INVENTION

Therefore, a need has arisen for a system and method which magnetically couples a peripheral camera to a portable information handling system display.

A further need exists for a system and method that extends battery charge life in a peripheral camera.

A further need exists for a system and method that spreads excess thermal energy from within a peripheral camera interior along a housing having insulative characteristics.

A further need exists for managing illumination of an end user having a visual image captured by a peripheral camera magnetically coupled to a display front face.

In accordance with the present invention, a system and method are provided which substantially reduce the disadvantages and problems associated with previous methods and systems for capturing visual images with a camera at an information handling system display. A portable information handling system magnetically couples a peripheral camera to an integrated display front face with ferromagnetic material disposed in portions of the display.

More specifically, a portable information handling system processes information with a processor and memory disposed in a portable housing having an integrated display to present the information as visual images. A peripheral camera magnetically couples to the display with magnets at a rear side of the camera and a ferromagnetic material behind just a portion of the display. The peripheral camera operates on battery with a resolution that adjusts based upon battery charge and expected camera operating time. The peripheral camera docks to receive power so that full power operations do not draw down the battery. In one embodiment a wireless charging receiver and transmitter have a curved shape that conforms to the form of the cylindrical camera housing and the base of the dock. In another embodiment, concentric rings of conductive material at the camera rear and/or dock interfaces with opposing pogo pins to conduct power and ground at any rotational orientation of the cylindrical housing. A capacitive sensor at a rear side of the camera detects end user taps to command capture of a still image or other functions, such as turning on and off video capture. A tapered conical thermally conductive intermediate casing fits within the cylindrical housing to press outward with an even distribution so that thermal energy is uniform at the housing outer surface. The peripheral camera includes a ring light or other illumination that selectively provides light against an end user face in coordination with display illumination adjustments to provide an optimal end user appearance.

The present invention provides a number of important technical advantages. One example of an important technical advantage is that a peripheral camera magnetically couples to a portable information handling system with a partial area of ferromagnetic material that does not substantially increase the weight of the system. Battery life is extended with a dock having external power applied through wireless charging or at a variety or rotational orientations and by varying power consumption based upon charge state and camera use context. A tap input function offers convenient commands to adjust the operating conditions at the camera, such as pausing video or taking a still picture. The peripheral camera has a compact form with extended internal power and thermally managed uniform exterior temperatures.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 14 depicts a flow diagram of a process to use a display color palette to locate a camera on a display;

DETAILED DESCRIPTION

A peripheral camera enhances end user interactions by magnetically coupling to a portable information handling system display panel. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display.

The information handling system may also include one or more buses operable to transmit communications between the various hardware components.

Figure 1:
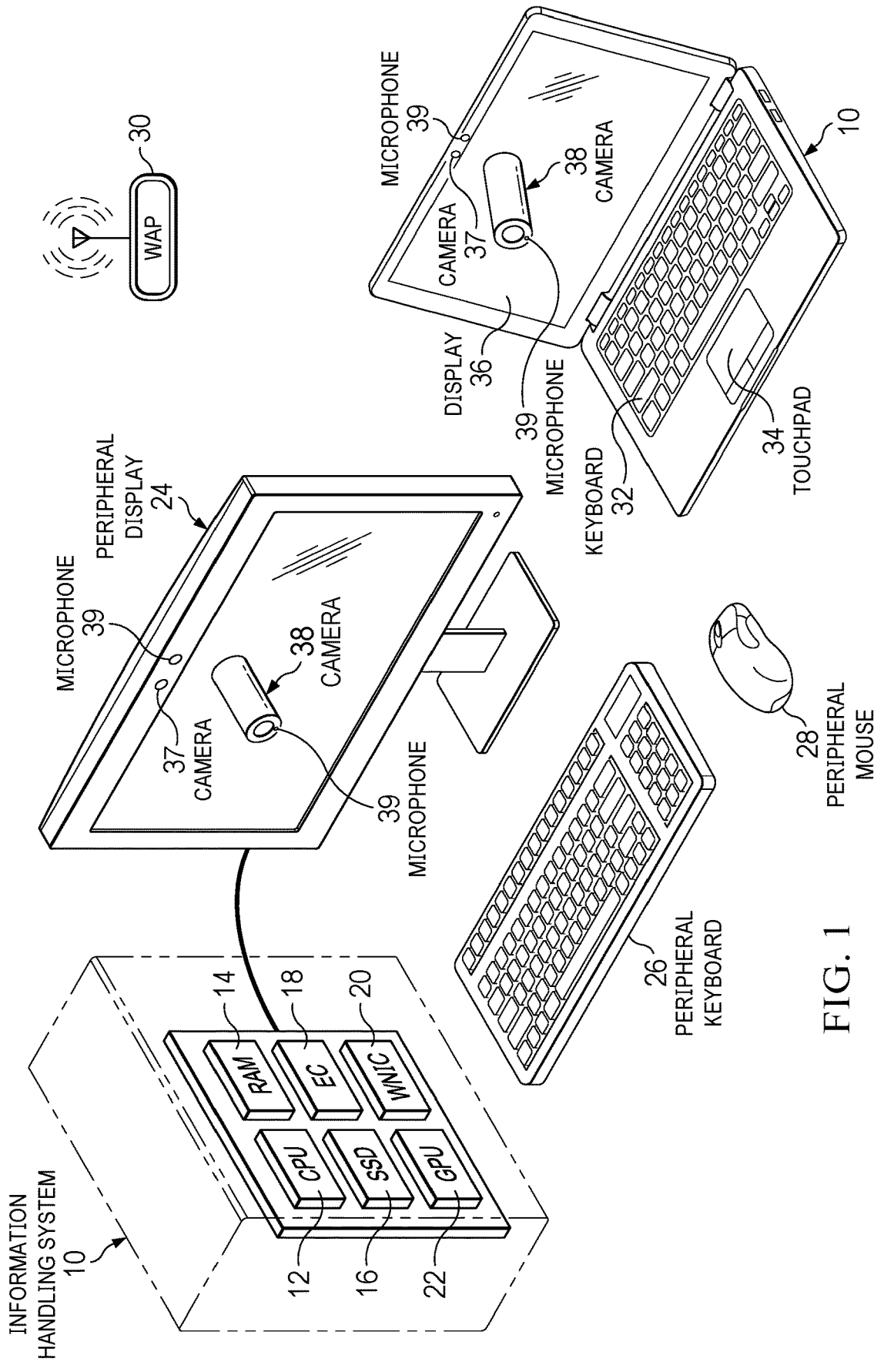
FIG. 1 depicts a portable information handling system having a camera magnetically coupled to peripheral display and to an integrated display.

Referring now to FIG. 1, a portable information handling system 10 is depicted having a camera 38 magnetically coupled to peripheral display 24 and to an integrated display 36. In the example embodiment, an information handling system 10 having a desktop configuration presents visual information as visual images at a peripheral display 24. A central processing unit (CPU) 12 executes instructions that process information in cooperation with a random access memory (RAM) 14 that stores the instructions and information. A solid state drive (SSD) 16 has persistent storage that stores information during power down periods, such as flash or other non-transient memory. For instance, SSD 16 stores an operating system, such as WINDOWS, and applications, such as videoconference communication applications, that execute on CPU 12. An embedded controller (EC) 18 interfaces with CPU 12 to manage operating conditions within the system, such as application of power, maintaining thermal constraints and interacting with peripheral devices. A graphics processing unit (GPU) 22 interfaces with CPU 12 and further processes the information to define visual images for presentation at peripheral display 24, such as by defining pixel values. A wireless network interface controller (WNIC) 20 provides network communications, such as with a wireless access point (WAP) 30. In the example embodiment, a peripheral keyboard 26 and a peripheral mouse 28 interface through embedded controller 18 to accept end user inputs.

An information handling system 10 having a portable configuration supports mobile operations with integrated power and input/output (I/O) devices. Portable information handling system 10 has an integrated keyboard 32 and an integrated touchpad 34 that accepts end user inputs. In addition, an integrated display 36 couples to the system housing to present information as visual images. Portable information handling system 10 has a similar set of processing components as those depicted in the example desktop system and can interact with peripheral devices in a similar manner. That is, portable information handling system interfaces with peripheral display 24, peripheral keyboard 26 and peripheral mouse 28 to provide an end user with enhanced I/O devices when in a fixed location. For instance, an end user relies upon integrated keyboard 32, integrated touchpad 34 and integrated display 36 during mobile operations, and uses peripheral keyboard 26, peripheral mouse 28 and peripheral display 24 when in a fixed location, such as a home office or enterprise cube.

In the example embodiment, a peripheral camera 38 is depicted that magnetically couples to a front face of peripheral display 24, similar to U.S. patent application Ser. No. 17/550,748, filed Dec. 14, 2021, entitled "Camera with Magnet Attachment to Display Panel," by Files, et. al. Peripheral camera 38 includes a magnet at a rear side that magnetically attracts to ferromagnetic material disposed within peripheral display 24 so that an end user can place the peripheral camera substantially aligned with a visual image presented on peripheral display 24, such as a videoconference window. Peripheral camera 38 has a minimal footprint to enhance mobility for portable use, however, portable information handling systems 10 tend to avoid ferromagnetic material in favor of aluminum or similar light weight materials. In order to support use of peripheral camera 38 with a portable information handling system 10, an area within integrated display 36 includes ferromagnetic material that attracts the magnets of peripheral camera 38. The amount of ferromagnetic material and the area within which the camera attaches can be less than the area of the display to help reduce system weight. In some instances, peripheral display 24 and portable information handling system 10 include an integrated camera 37 and microphone 39 that supports videoconferences when a peripheral camera is not available, albeit with reduced quality of captured visual images. In such instances, the presence of peripheral camera 38 at the front face of the display panel is detected, such as with a touchscreen or Hall sensor, and in response camera and microphone configurations are adjusted to optimize the end user experience. For instance, when a Hall sensor behind integrated display 36 detects magnets of peripheral camera 38, portable information handling system 10 turns off integrated camera 37 to use the higher quality images available from peripheral camera 38 and then selects one or both of microphones 39 of peripheral camera 38 or integrated at display 36 to record audible sound. For example, the microphone with the higher audible quality is selected or both microphones are selected to have dual audio recordings. Peripheral camera 38 may wirelessly communicate with portable information handling system 10 directly or indirectly through WAP 30.

Figure 2:
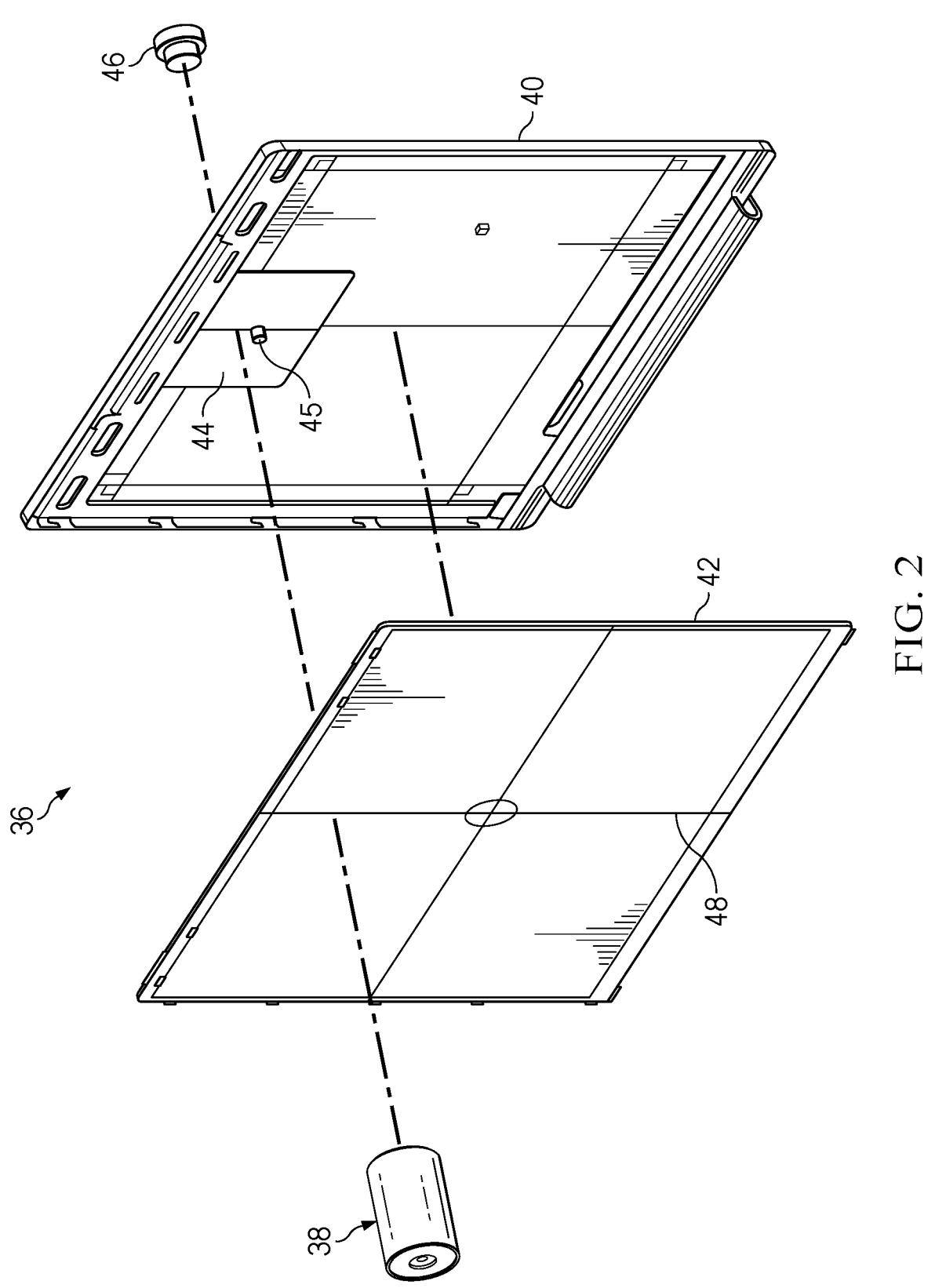
FIG. 2 depicts an exploded perspective view of an integrated display panel having a ferromagnetic material in a partial area to magnetically attract the peripheral camera.

Referring now to FIG. 2, an exploded perspective view depicts integrated display panel 36 having a ferromagnetic material in a partial area to magnetically attract peripheral camera 38. A display panel 42, such as a OLED or LCD display panel, couples to a housing 40 of the portable information handling system over the ferromagnetic material 44 so that magnets at the rear side of peripheral camera 38 couple against display panel 42 and with ferromagnetic material 44 to hold peripheral camera 38 in place. A Hall sensor 45 disposed between ferromagnetic material 44 and display panel 42 detects magnets of peripheral camera 38 detect when peripheral camera 38 couples in place so that a camera and microphone selection is initiated. The surface area size and positioning of ferromagnetic material 44 varies to provide an attachment location coordinated with a likely position of a videoconference window or the alignment of an end user's eyes with peripheral camera 38 when viewing a videoconference. When the videoconference application is active, display panel 42 can show position reference lines 48 to aid an end user in placement of peripheral camera 38. In one example embodiment, to help minimize a weight of the portable information handling system, ferromagnetic material 44 is a steel plate that has 10% or less of the surface area of display panel 42. Other arrangements of a ferromagnetic material may be used, such as strips of steel or distributed portions that an end user finds by dragging peripheral camera 38 across the display front face. Further, the steel plate may have a greater or smaller surface area, such as 20% or less than the surface area of the display, with a balance between total system weight and a desired camera magnetic coupling area. In another embodiment, in addition to ferromagnetic material 44 or as a separate attachment mechanism, a secondary magnet or ferromagnetic material 46 is placed on a rear side of housing 40 to attract peripheral camera 38 through housing 40. In one embodiment, a secondary magnet or ferromagnetic material 46 is an opposing pole magnet that couples to peripheral camera 38 for storage when not in use and has substantially the same circumference as the peripheral camera cylindrical housing so that it can store when not in use by attaching the peripheral camera end.

Figure 3:
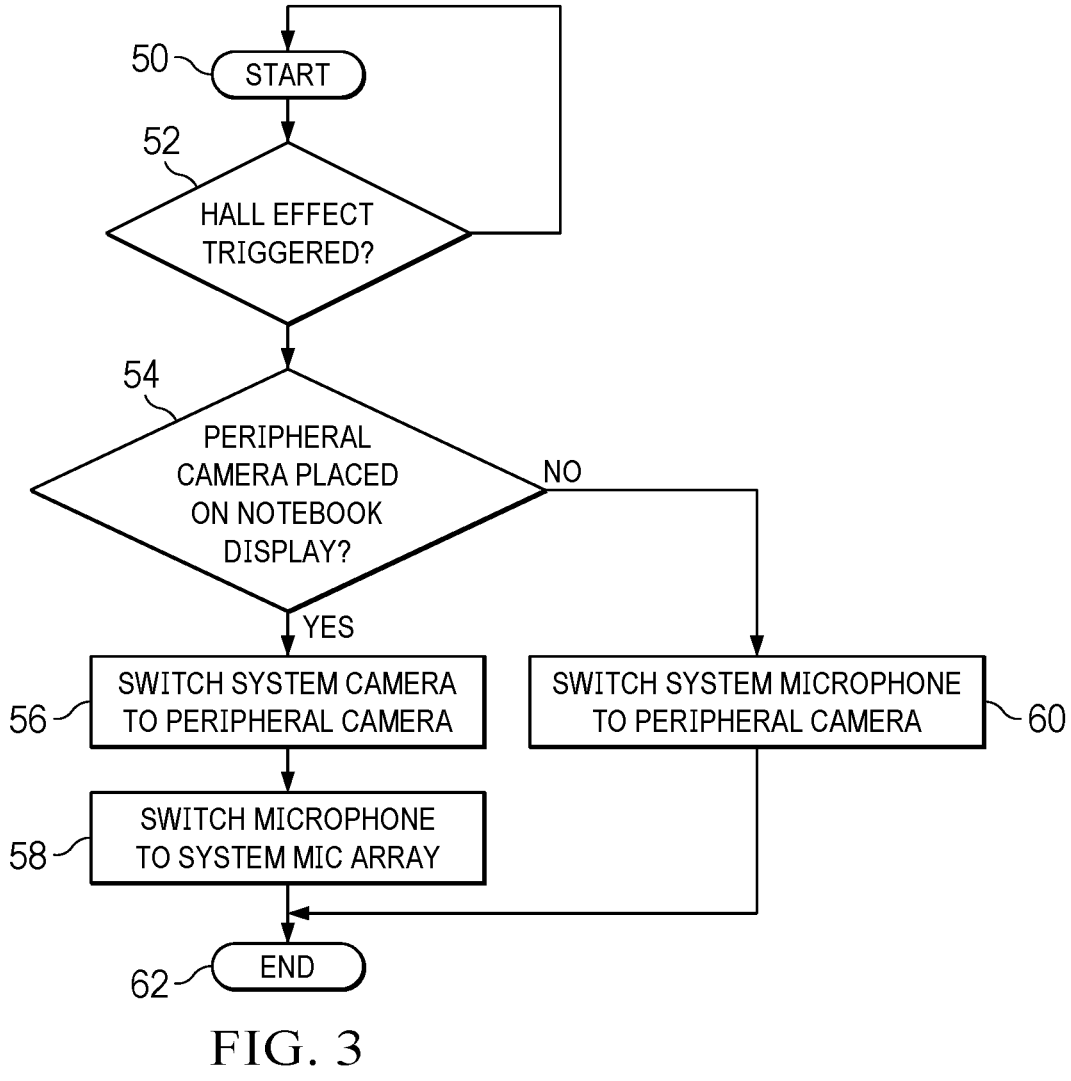
FIG. 3 depicts a flow diagram of a process for selecting a peripheral camera or integrated camera to capture visual images at a portable information handling system.

Referring now to FIG. 3, a flow diagram depicts a process for selecting a peripheral camera or integrated camera to capture visual images at a portable information handling system. The process starts at step 50 with monitoring of a sensor to detect placement of the peripheral camera at the display panel, such as a Hall sensor or a touch pattern at a touchscreen display. At step 52 a determination is made of whether the peripheral camera is at the display panel, such by triggering the Hall effect sensor. If not, the process returns to step 50. If the camera is detected at the display panel, the process continues to step 54 to determine if the peripheral camera is placed on the display panel. In one embodiment, the Hall effect sensor detects proximity of the peripheral camera and the touchscreen display confirms contact of the peripheral camera. When the peripheral camera couples to the display panel front face, the process continues to step 56 to switch the portable information handling system to use the peripheral camera visual images instead of the integrated camera visual images. At step 58, the information handling system configures to use the integrated microphone over the peripheral camera microphone due to the better sound capture quality. When at step 54 the peripheral camera triggers the Hall switch due to removal of the presence of the magnet, the process continues to step 60 to configure the microphone of the peripheral camera for use with the peripheral camera. When the peripheral camera is not coupled to the display, the end user can manually select either the peripheral or integrated camera for use, however, the integrated microphone may be poorly positioned to support the peripheral camera. At step 62, the process ends.

Figure 4:
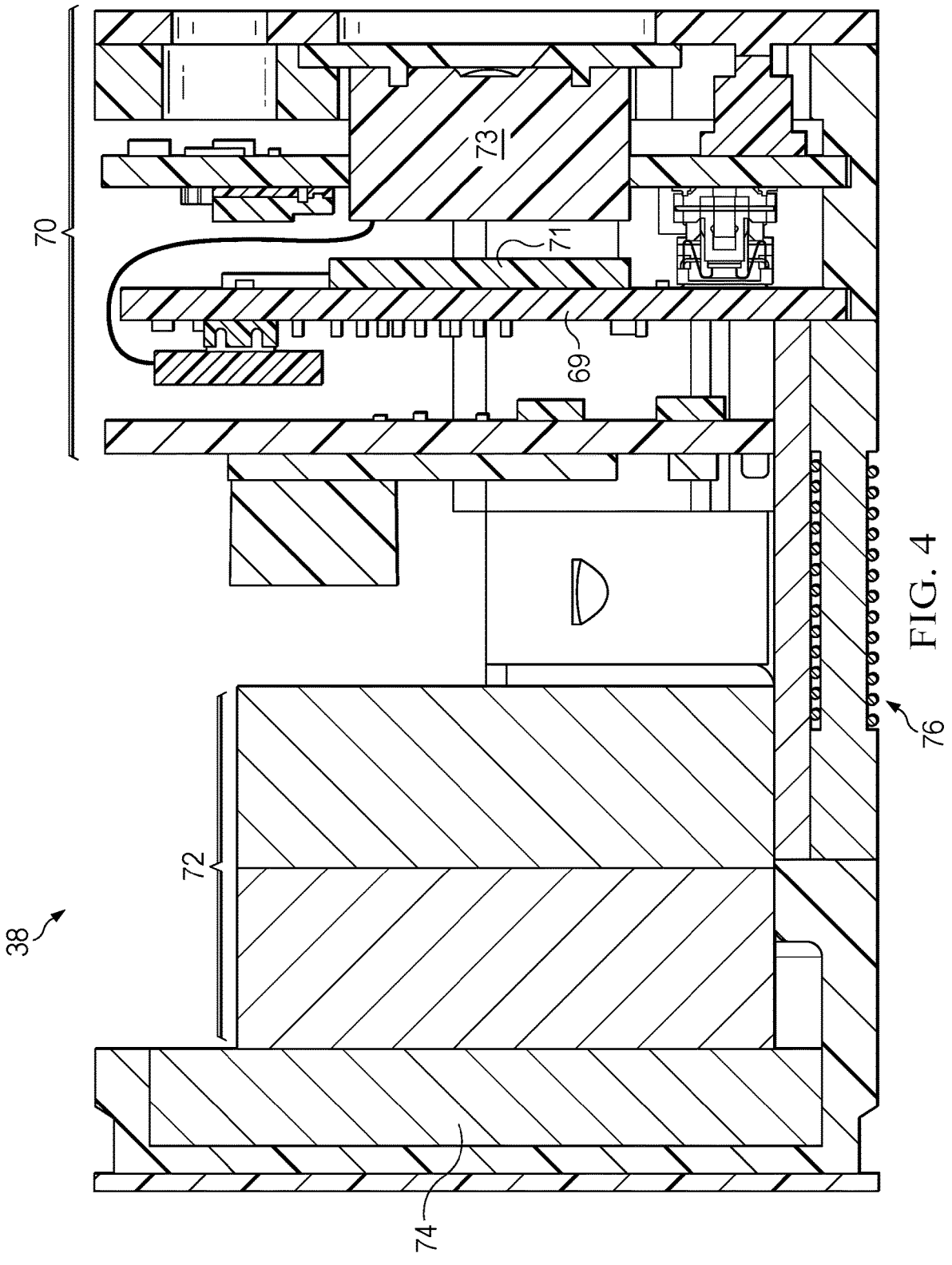
FIG. 4 depicts a cross sectional view of an example of the peripheral camera internal components.

Referring now to FIG. 4, a cross sectional view depicts an example of peripheral camera 38 internal components. A camera module 70 includes an image sensor 73 and control printed circuit board 69 that manage camera operations, such as focus and aperture, with a processing resource 71. Batteries 72 are rechargeable lithium ion batteries in a coin cell format, such as with a total energy storage of 800 to 1000 mWh. A magnet 74 at the camera rear side magnetically couples the camera to a display front face as illustrated above. A wireless charging receiver 76 couples to the bottom side of camera 38 and accepts a wireless charge when camera 38 rests in a dock having wireless charging. For example, as described in greater detail below, camera 38 rests on a dock that includes a wireless charger to provide power to camera 38 both for charging the batteries and running the processing resource. In full power operations, image sensor 73 captures high quality images, such as 4K resolution images, with a high framerate, such as 60 frames per second (FPS). Operating peripheral camera 38 to capture high quality images can result in a drawdown of the battery charge, especially where a compact camera footprint is achieved with minimal battery capacity. Peripheral camera 38 can operate continuously at full resolution when on the dock and receiving a wireless charge, however this restricts the positioning of the camera to the dock instead of magnetically coupled to the display panel. In order to offer an end user with a choice between image quality and camera positioning, processing resource 71 executes instructions stored in integrated flash memory to adjust the camera settings, such as resolution and framerate, when the camera operates undocked so that the end user experiences a battery life optimized for image quality and camera position.

Figure 5:
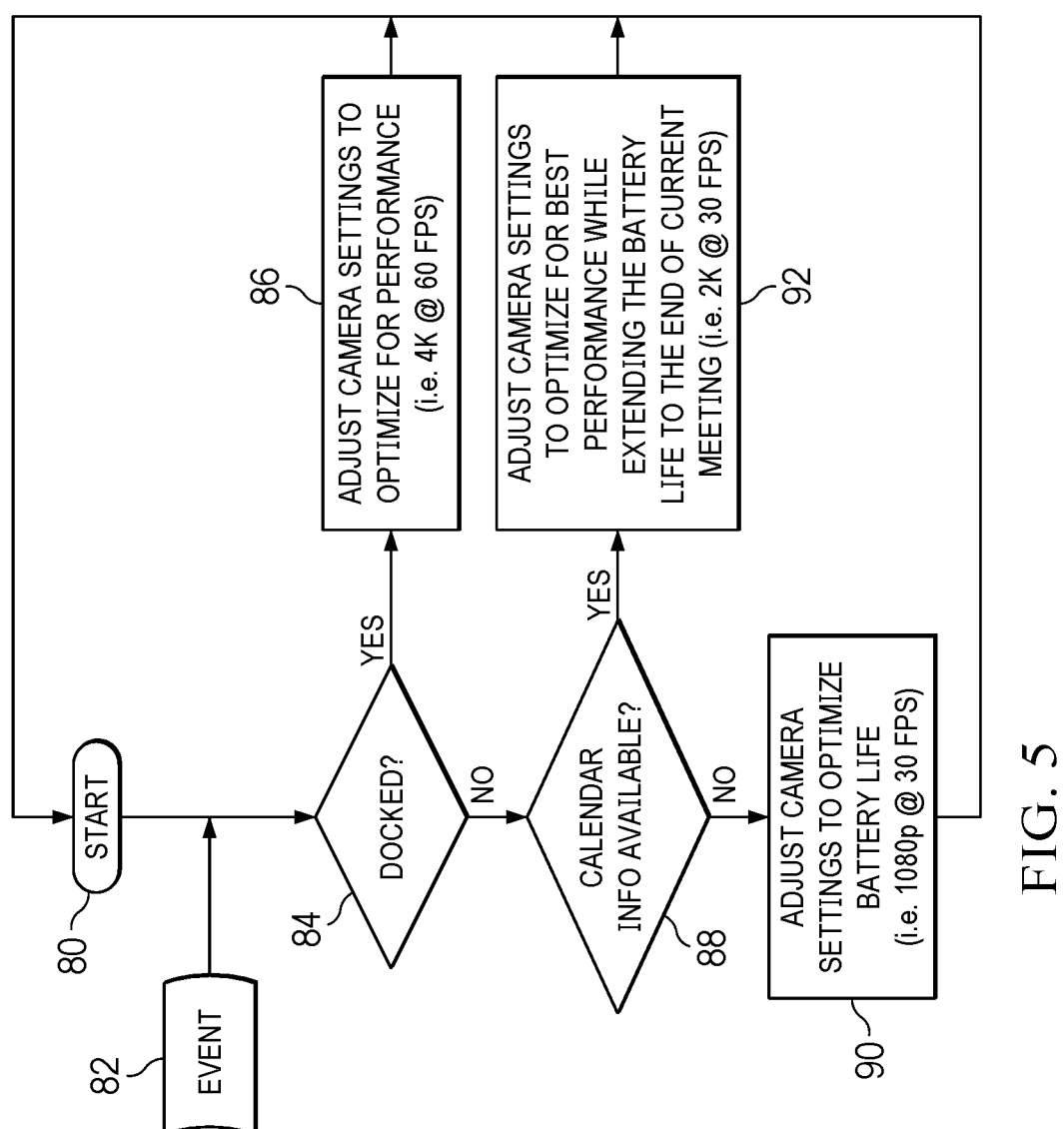
FIG. 5 depicts a flow diagram of a process for adjusting wireless peripheral camera video stream quality based on context.

Referring now to FIG. 5, a flow diagram depicts a process for adjusting wireless peripheral camera video stream quality based on context. The process starts at step 80 with monitoring of the camera context based upon operational state. At step 82, an event is detected, such as a GPIO wake event from an accelerometer, a charger, an input button, etc. . . . . At step 84, a determination is made of whether the camera is docked, such as based upon detection of a wireless charging signal or a charging pin contact. If the camera is docked so that external power is available, the process continues to step 86 to adjust the camera settings and optimize the camera performance, such as with a full 4K resolution and 60 FPS framerate. If at step 84 the camera is not docked, the process continues to step 88 to estimate an amount of battery life that the end user will expect from the undocked operation. In the example embodiment, an estimate of the necessary battery life is made from the end user calendar showing a scheduled amount of time for an anticipated videoconference. If a calendar is available at step 88, the process continues to step 92 to adjust the camera settings to optimize camera resolution and framerate while extending the battery life to the length of the scheduled meeting. For instance, with a given battery charge and scheduled meeting length, the camera processing resource sets the resolution at 2K and 30 FPS. The resolution settings may be commanded from an information handling system, such as by a camera operating system driver, or locally by the camera resource when the anticipated camera usage time is provided. If a calendar is not available or does not include the current use, the process continues to step 90 where other factors may be used, such as based on an analysis of historical camera use or the availability of the integrated camera should the battery run out of charge. In the example embodiment, a default setting of 1080p at 30 FPS resolution is used. The process then returns to step 80 to continue monitoring camera usage context.

Figure 6:
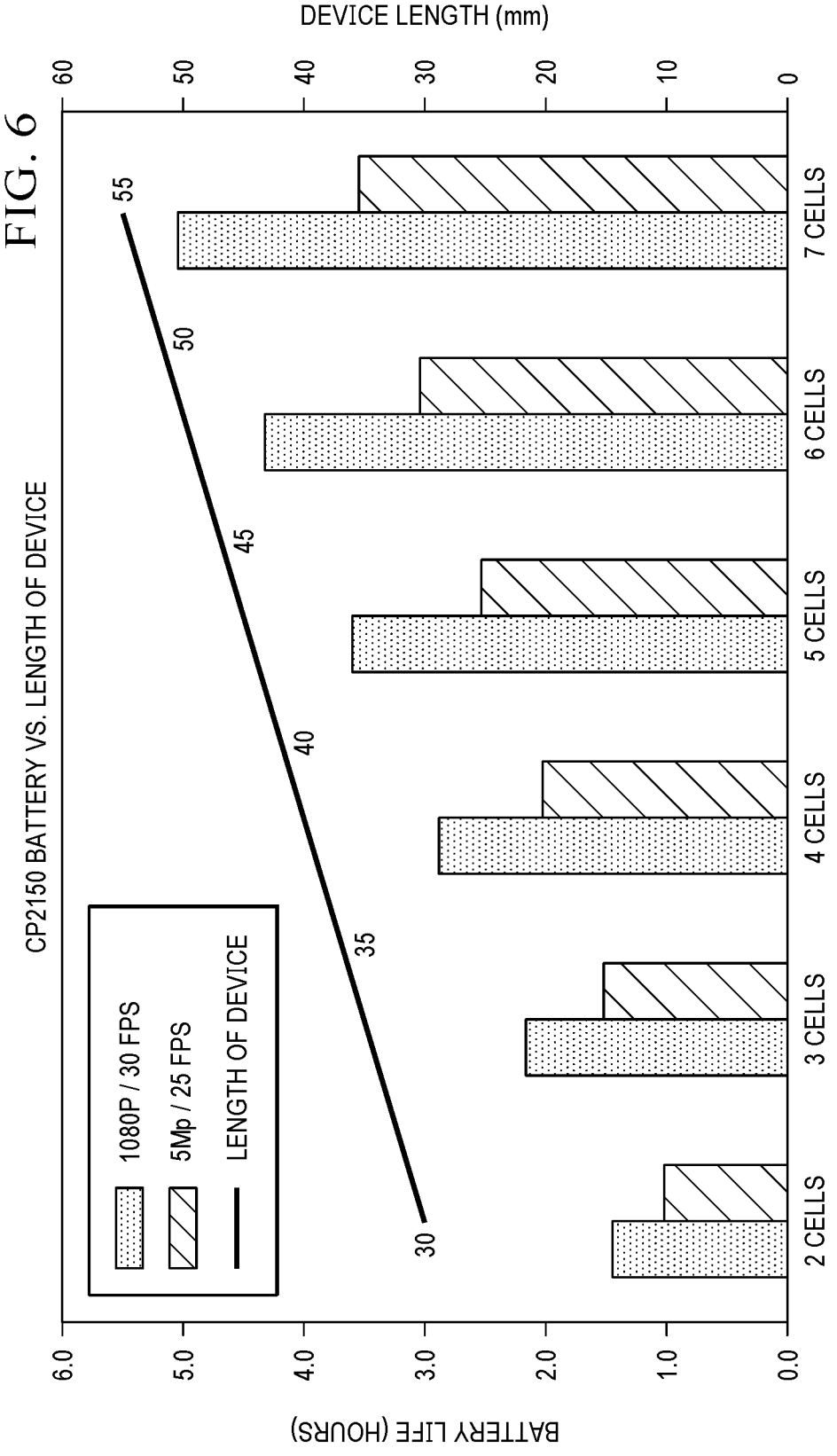
FIG. 6 depicts a graphical diagram of examples of battery charge life management based on context and resolution.

Referring now to FIG. 6, a graphical diagram depicts examples of battery charge life management based on context and resolution. In the example embodiment, the camera length increases from 30 mm with two battery cells to 55 mm with seven battery cells. As the number of battery cells increases, the battery life of the camera increases, however, increasing the number of battery cells increases the camera length and weight so that a more power magnet is needed to magnetically couple the camera in position at a display panel. When the camera captures visual images with a resolution of 1080 P and 30 FPS, battery life is extended by approximately one-third. As an example, peripheral camera 38 image sensor draws about 135 mW at 1080 P resolution and WiFi transmit power draws about 800 mW to communicate this payload to a WAP or information handling system. When resolution increases to 4K and 30 FPS, the image sensor power draw increases to 230 mW and the WiFi power draw increases to 1050 mW. Throttling camera power use when in a wireless communication and battery power only operational mode improves battery life while the higher resolution option remains open to an end user by setting the camera in a dock or manually overriding the reduced resolution when desired, such as during short and important videoconferences where battery life presents less of a problem.

Figure 7A:
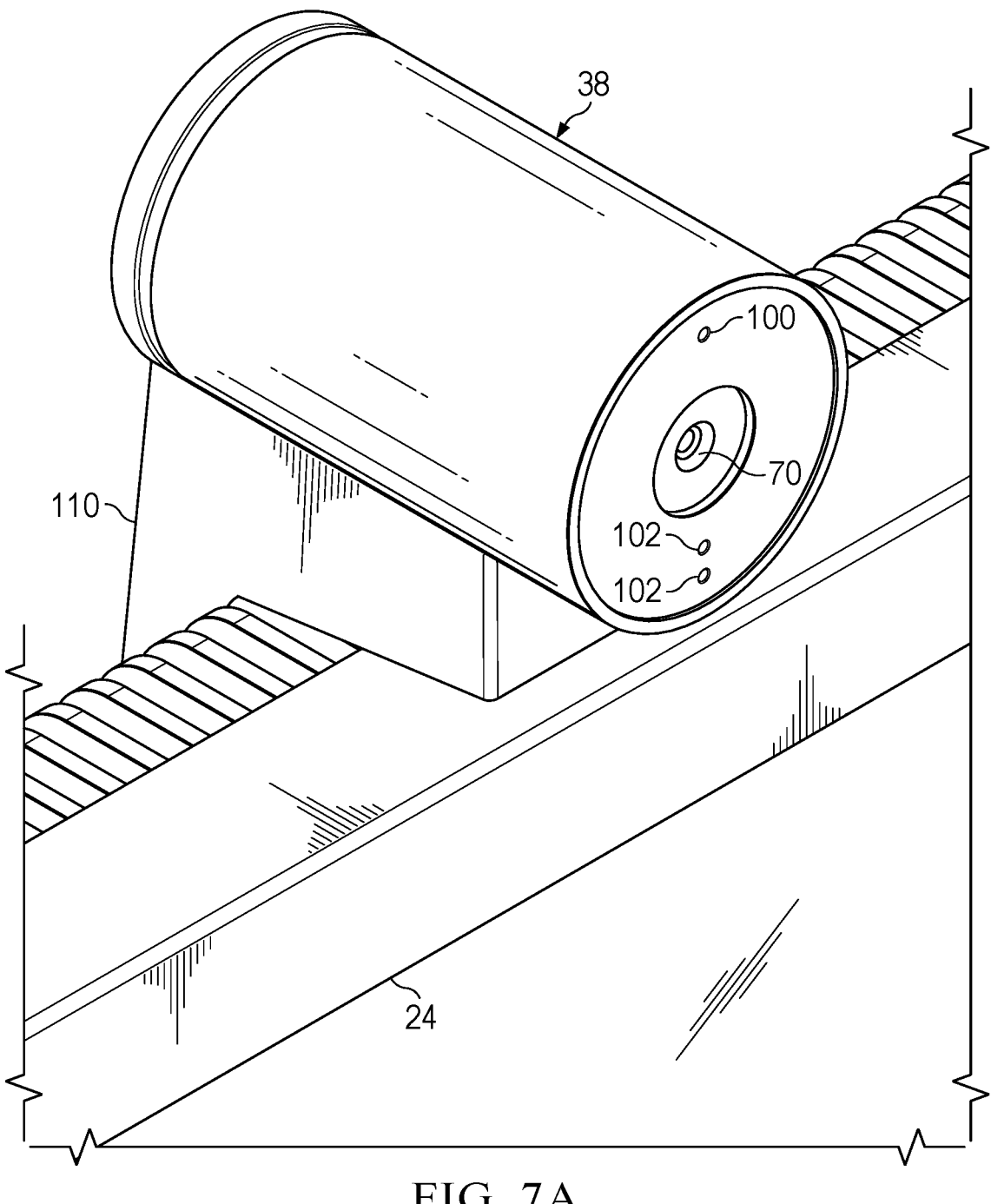
FIGS. 7A, 7B and 7C depict a peripheral camera and charging dock pogo pin charging arrangement having power transfer through dual concentric rings.
Figure 7B:
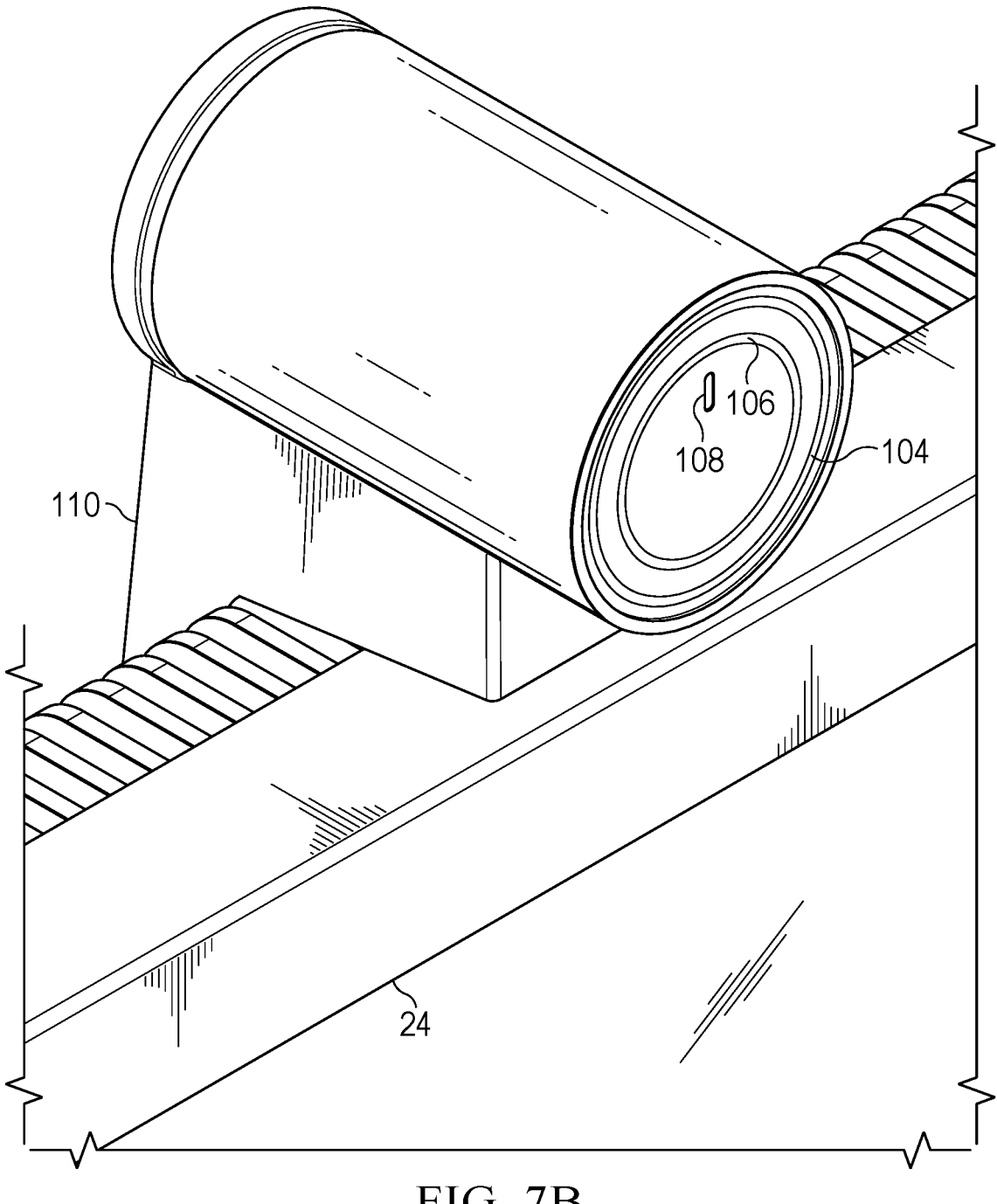
Figure 7C:
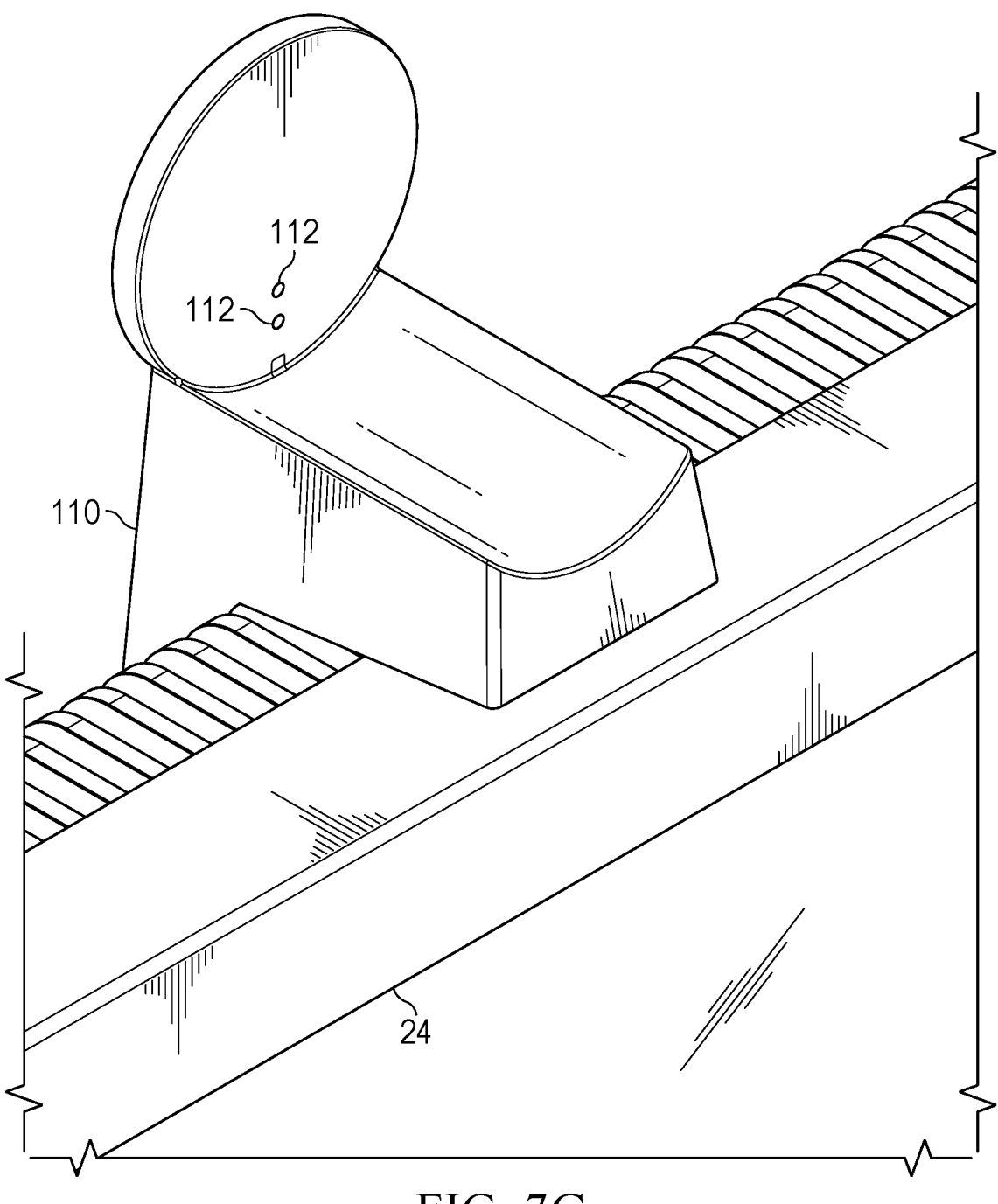

Referring now to FIGS. 7A, 7B and 7C, a peripheral camera and charging dock pogo pin charging arrangement depict power transfer through dual concentric rings. FIG. 7A depicts peripheral camera 38 resting in a dock 110 that couples to an upper side of a peripheral display 24. The camera assembly 70 is directed forward to capture visual images and has an indicator LED 100 that illuminates when in use. In the example embodiment, a set of pogo pins are exposed at the front side of peripheral camera 38, one for accepting charge and a second for accepting ground. FIG. 7B depicts peripheral camera 38 resting in dock 110 having the front face of the camera against a rear side of the dock to secure the camera against unauthorized capture of visual images. At the rear side of peripheral camera 38 a first concentric ring 104 accepts charge and a second concentric ring 106 accepts ground. An LED indicator 108 provides an indication of charge being available to peripheral camera 38 and an upright orientation. FIG. 7C depicts dock 110 without peripheral camera 38 and having first and second pogo pins 112, a first to provide charge and a second to provide ground. When peripheral camera 38 rests in dock 110, pogo pins 112 contact against concentric rings 104 and 106 to communicate charge from dock 110 to peripheral camera 38 independent of the orientation of peripheral camera 38. In one example embodiment, charge is applied to the concentric rings when a Hall sensor of the dock detects the magnet of the camera and USB-type confirmation is provided through the charging interface or wireless communication. Alternatively, dock 110 and peripheral camera 38 can detect contact to initiate charge.

In various embodiments, peripheral camera 38 and dock 110 communicate power through wireless charging, however, to communicate power the camera wireless charging receiver has to locate in proximity with the dock wireless charger. Concentric rings 104 and 106 contact pogo pins 112 in any orientation so that peripheral camera 38 will receive charge when it is placed in dock 110 regardless of the rotational orientation. In one embodiment, concentric rings of conductive material may also be formed on the front side of peripheral camera 38 so that it charges in any orientation when the front side of the camera is placed against the back side of the dock. As an example, the concentric rings may be formed with a conductive material that blends into the material of the camera housing, such as a conductive paint, graphene, or similar material. In alternative embodiments, the concentric rings 104 and 106 are formed in dock 110 so that pogo pins 102 contact the concentric rings of the dock at any rotational orientation of the camera when resting in the dock.

Figure 8:
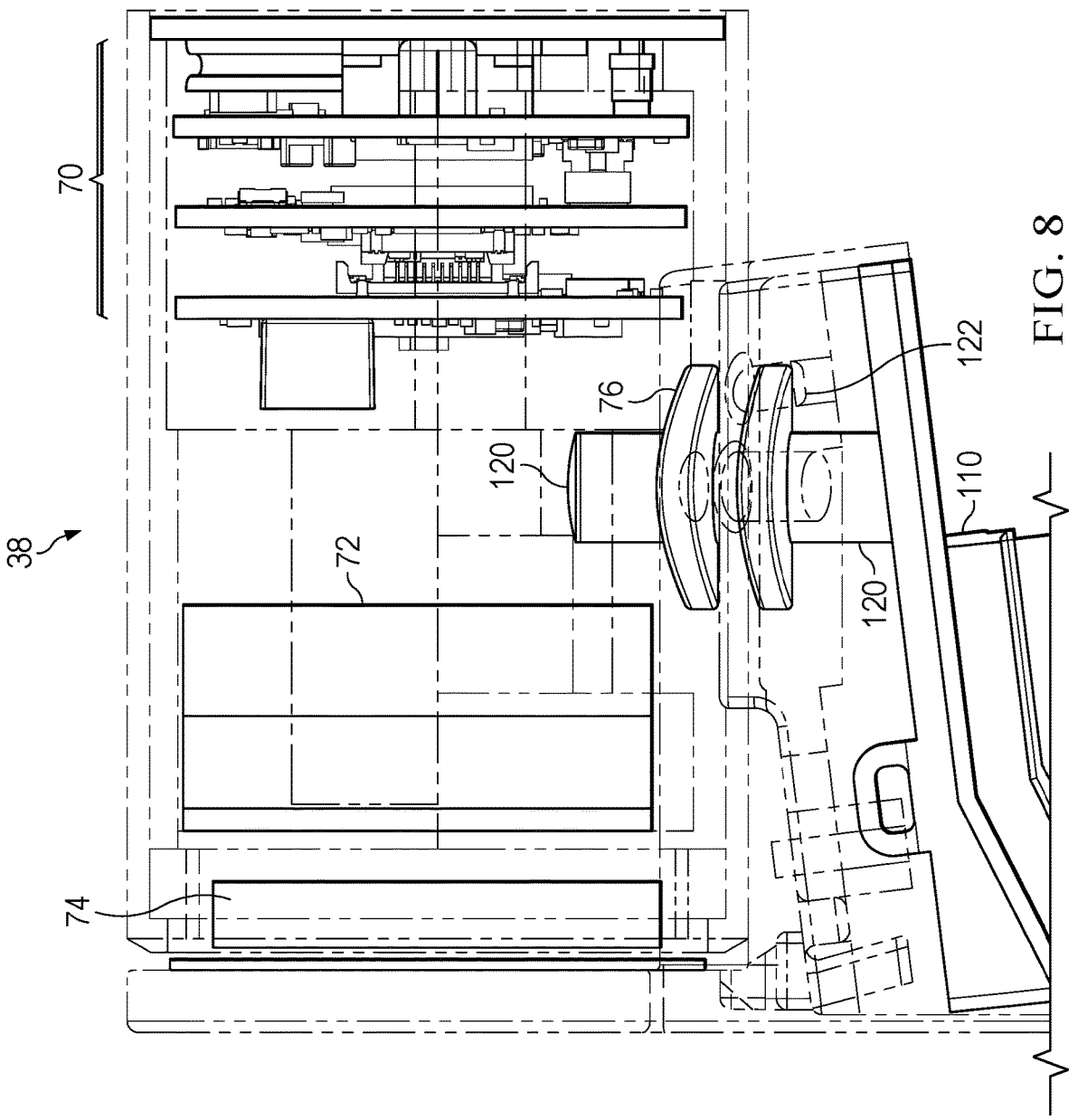
FIGS. 8, 8A and 8B depict an example embodiment of the peripheral camera in the dock to accept charge wirelessly.
Figure 8A:
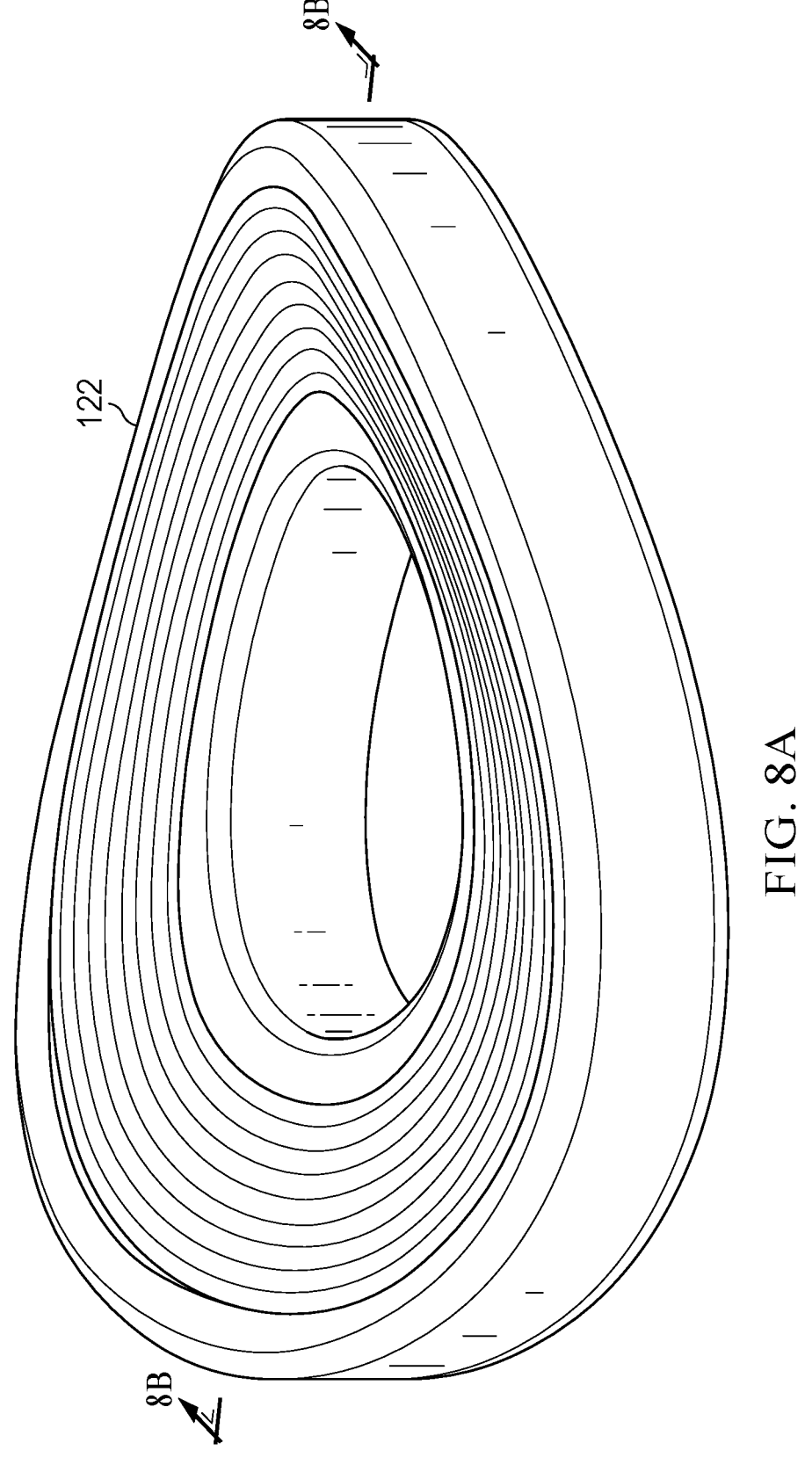
Figure 8B:
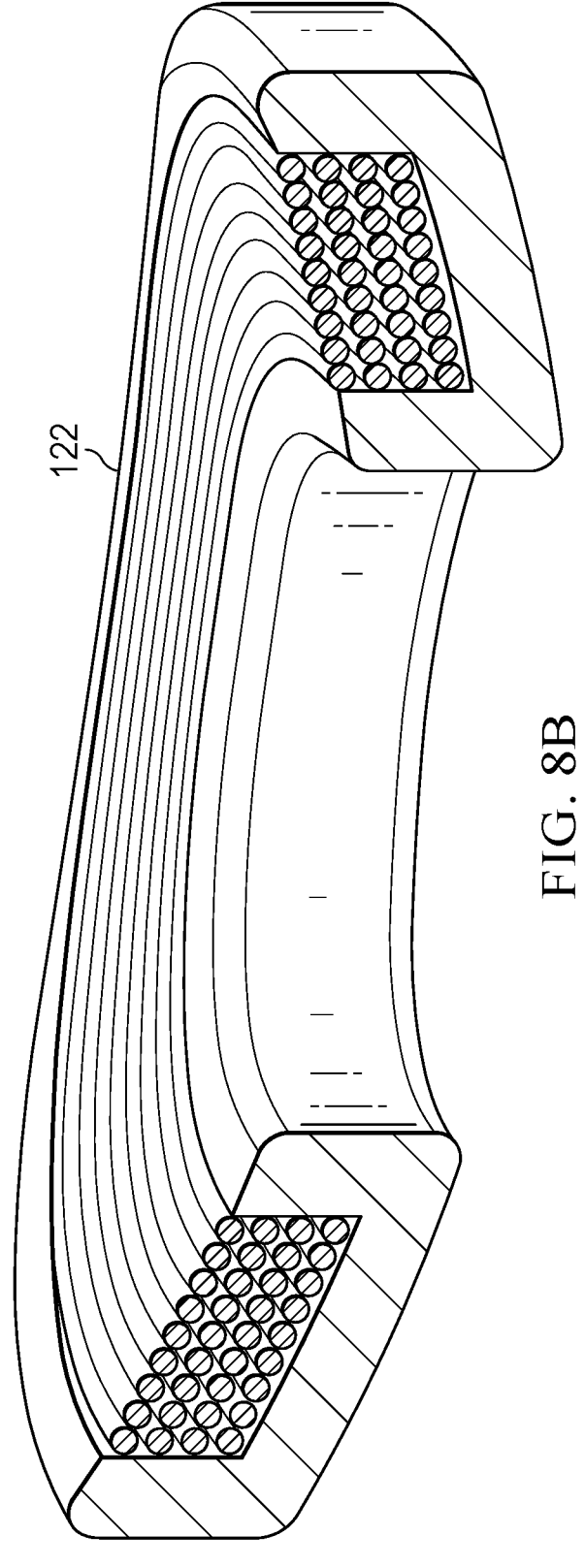

Referring now to FIGS. 8, 8A and 8B, an example embodiment depicts peripheral camera 38 in dock 110 to accept charge wirelessly. A three dimensional wireless coil structure to transmit and receive power provides improved power transfer efficiency and reduced thermal impacts from charging by conforming with the curvature of the camera and dock. FIG. 8 depicts a side view of camera 38 to illustrate positioning of a wireless charging receiver 76 and wireless charging transmitter 122 when peripheral camera 38 rests in dock 110 to wirelessly charge. Wireless charging receiver 76 interfaces with the circuit board of camera assembly 70 to communicate received charge to batteries 72. Magnet 74 couples peripheral camera 38 into place against dock 110 and is detected by a Hall sensor 45 of dock 110 to initiate wireless charging by wireless charging transmitter 122 when the camera is placed on dock 110. In addition, a pair of alignment magnets 120 have opposing poles that attract to hold peripheral camera 38 in place at dock 110 and change the magnetic field to generate an interrupt by Hall sensor 45. FIG. 8A depicts an upper perspective view of wireless charging transmitter 122 having a central opening through which the alignment magnets 120 operate. The central opening allows the magnetic attraction of the alignment magnets to rotationally orient peripheral camera 38 in dock 110 so that the wireless charging transmitter and receiver align. FIG. 8B depicts a side perspective sectional view of wireless charging transmitter 122 to illustrate the conductive wires that conduct current that generate magnetic fields to transmit power. The central opening around the alignment magnets supports charge transfer without the alignment magnetic field interfering with the charge transfer magnetic field. Wireless charging receiver 76 has an opposing shape that conforms with the shape of the wireless charging transmitter so that a minimal spacing is provided across which the charging magnetic field has to operate for optimal wireless charging coupling efficiency.

Figure 9:
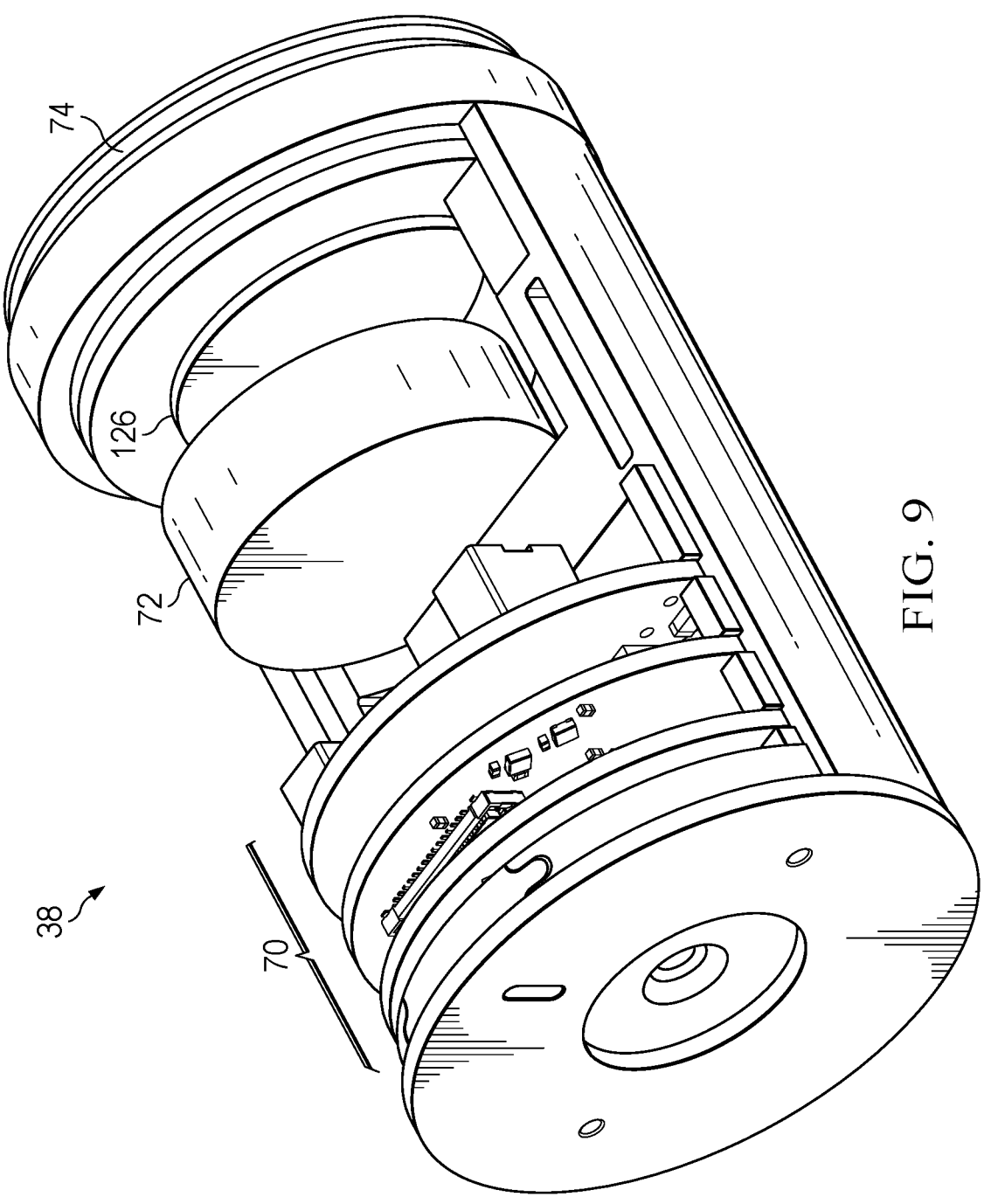
FIG. 9 depicts an upper perspective view of the peripheral camera including a capacitive detection surface at a rear side.

Referring now to FIG. 9, an upper perspective view depicts peripheral camera 38 including a capacitive detection surface 126 at a rear side. In the example embodiment, capacitive detection surface 126 couples at an inner side of magnet 74 proximate batteries 72 to detect touches at a rear side of peripheral camera 38 that are reported to a processing resource of camera assembly 70. For instance, the capacitive touch surface detects proximity of an end user when the end user taps peripheral camera 38 at the rear side surface to report an input. In alternative embodiments, a capacitive touch detection surface attaches at a rear side of peripheral camera 38, although any thickness between magnet 74 and display ferromagnetic material can reduce the effectiveness of magnetic attraction to couple peripheral camera 38 to a display. Placement of capacitive touch at a rear side of peripheral camera 38 offers a tap input to the commands camera operations. For instance, a single tap commands the camera to take a still picture of the field of view and store the still image locally, such as a picture of a whiteboard generated during a meeting. In one embodiment, peripheral camera 38 stores the still picture locally in flash memory of the camera assembly until the camera docks to receive external power and then downloads the still picture to an information handling system when external power is available. The still picture may be taken with the camera in standby or while the camera is streaming video. In alternative embodiments, other types of touch inputs are supported, such as a double tap to mute the camera microphone or pause the camera video. The camera can include marked indications on the rear side that show available inputs and multiple separate touch detection sensors may be included to accept touch inputs at different locations of the camera rear surface.

Figure 10:
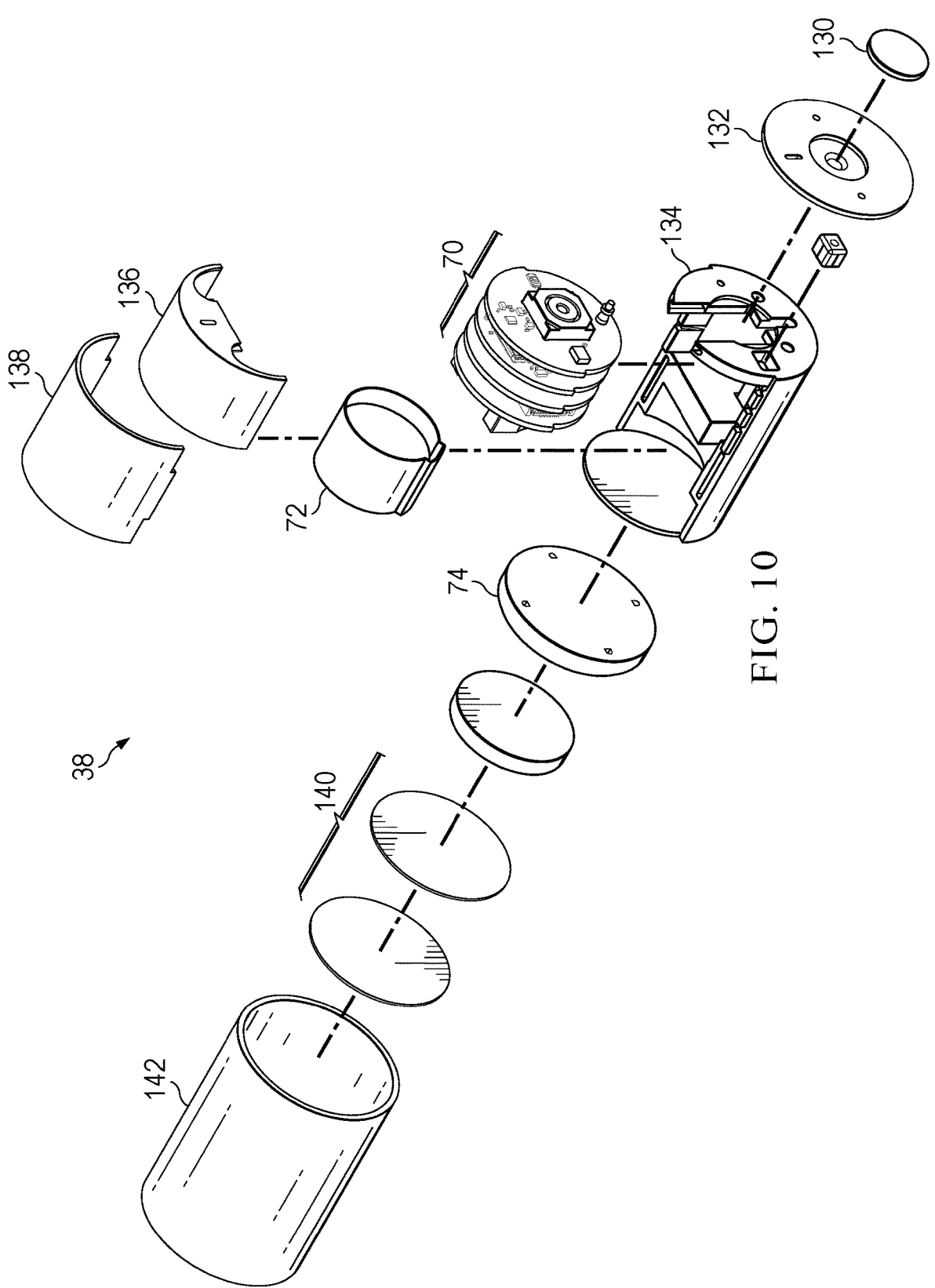
FIG. 10 depicts an upper perspective exploded view of the peripheral camera having a housing that promotes thermal dissipation from an interior to an exterior.

Referring now to FIG. 10, an upper perspective exploded view depicts peripheral camera 38 having a housing 142 that promotes thermal dissipation from an interior to an exterior. An aluminum base chassis 134 holds the camera assembly 70 and battery 72 with at least some thermal coupling of heat generating components to the aluminum material. For example, a WNIC for WiFi, a wireless charging receiver, power supply, video codec and battery 72 all generated thermal energy during normal operations. The amount of thermal energy varies based upon the type of operations and tends to reach maximum amounts when operating at full resolution in a docked position. An aluminum cover 136 couples to aluminum base chassis 134 over camera assembly 70 to help promote thermal dissipation from the processing components coupled to the camera assembly circuit boards. A plastic cover 138 couples to aluminum base chassis 134 over batteries 72 so that radio energy related to wireless communications can exit the camera interior. Magnets 74 couple to the rear side of aluminum base chassis 134 and thin cushions 140 couple to magnets 74 to protect the display from damage when the camera magnetically couples in place. A front cover 132 and cap 130 couple to the front side of peripheral camera 38 to protect the camera image sensor and lens. An outer plastic cylindrical housing fits around the aluminum base chassis 134, aluminum cover 136 and plastic cover 138 to hold the assembly together. A durable plastic outer cover is protective and has an aesthetic appearance with a translucent material to provide a glowing appearance from display illumination that blends with the display image. However, the plastic outer layer is insulating of thermal energy so that the camera interior can reach excessive temperatures and have uneven surface temperatures.

Figure 11:
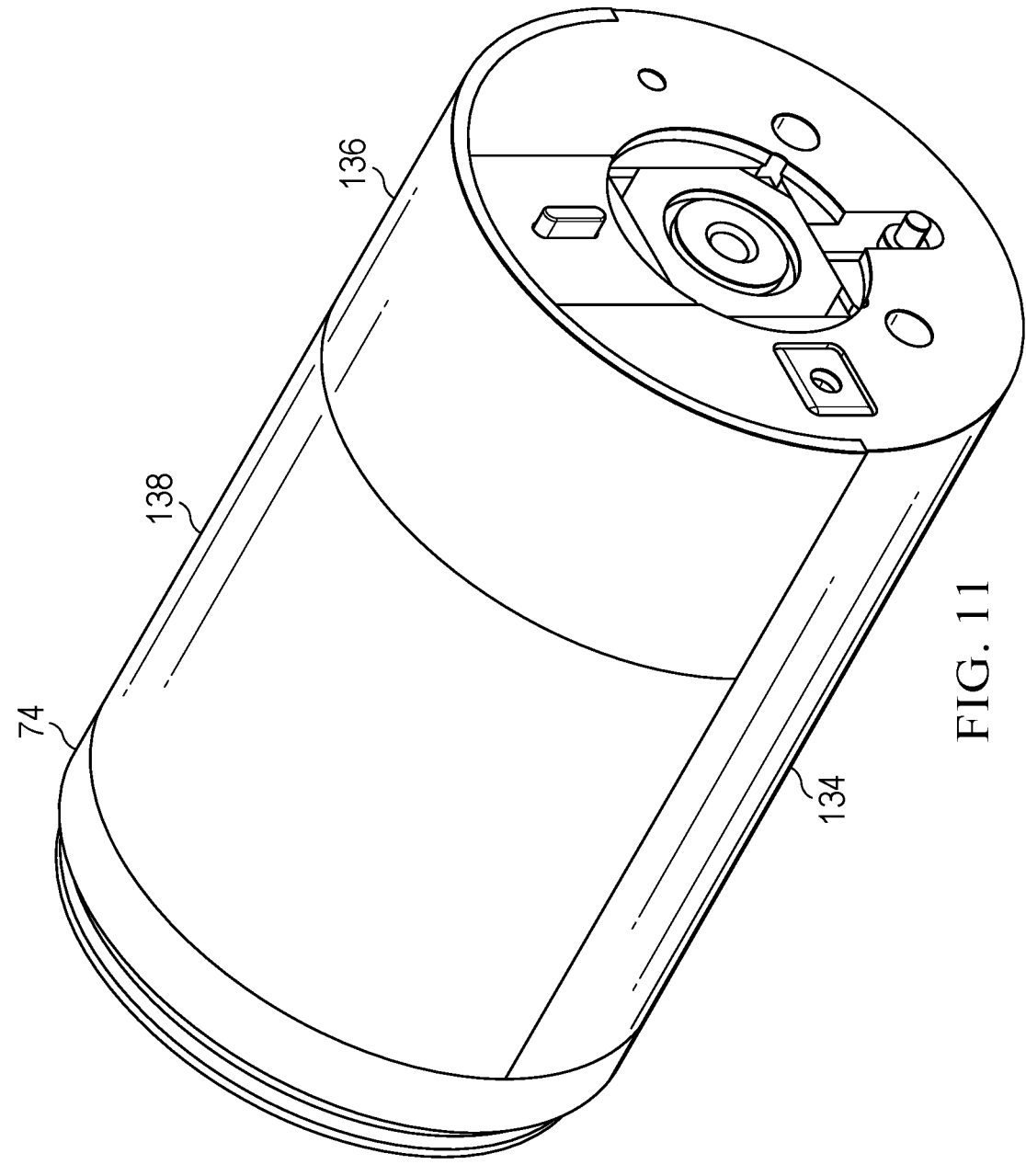
FIG. 11 depicts a side perspective view of the peripheral camera with the interior housing assembly prepared to accept the exterior housing cylinder.

Referring now to FIG. 11, a side perspective view depicts the peripheral camera with the interior housing assembly prepared to accept the exterior housing cylinder. Aluminum base chassis 134 and aluminum cover 136 provide good thermal transfer surfaces. Plastic cover 138 has an insulative thermal characteristic relative to the aluminum of the other portions so that the outer surface of the housing will have an uneven thermal profile with the plastic portion typically cooler than the aluminum portion. Magnet 74 extends from the rear side of peripheral camera 38 and offers a thermal pathway to reject excess thermal energy through either the display panel or the dock. Although this thermal pathway provides rejection of excess thermal energy, high temperatures not desired relative to the rest of the housing so that some thermal rejection through the remainder of the housing helps to manage temperature extremes during high resolution operations.

Figure 12:
FIG. 12 depicts a tapered thermal intermediate casing that encourages uniform pressure against the outer cylindrical housing to encourage even heat dissipation.

Referring now to FIG. 12, a tapered thermal intermediate casing 144 is depicted that encourages uniform pressure against the outer cylindrical housing 142 to encourage even heat dissipation. Intermediate casing 144 puts pressure against the inside wall of cylindrical housing 142 to directly tie thermal transfer from the internal aluminum housing components to the plastic outer housing. Distributing thermal energy from intermediate casing 144 uniformly is accomplished by uniformly pressing the outer surface of intermediate casing 144 against the inner surface of cylindrical housing 142. To provide this uniform distribution, a taper 146 is formed in intermediate casing 144 so that, as cylinder 142 couples over the camera assembly the taper is pressed upon by the cylindrical inner perimeter to reduce the taper and introduce and outward bias of the intermediate casing against the housing. In the example embodiment, a taper of two degrees or slightly greater than two degrees is used. Cylindrical housing 142 fits over the end of the camera assembly at magnet 74 where intermediate casing 144 has the smallest circumference and slides to the front where the circumference of intermediate casing 144 is slightly greater than intermediate casing 144 so that compression of the larger circumference translates outward force at the smaller circumference to press against cylindrical housing 142. Intermediate casing 144 receives thermal energy from the aluminum inner housing portions and spreads the thermal energy to the thermally insulative outer housing. In one embodiment, intermediate casing 144 is thermally coupled to magnet 74 to further advance thermal spreading. Alternatively, intermediate casing 144 may be thermally separate from magnet 74 to spread heat only from the internal aluminum housing portions. Intermediate casing 144 is a thin thermally conductive material, such as graphene or other conventional thermal spreaders.

Figure 13:
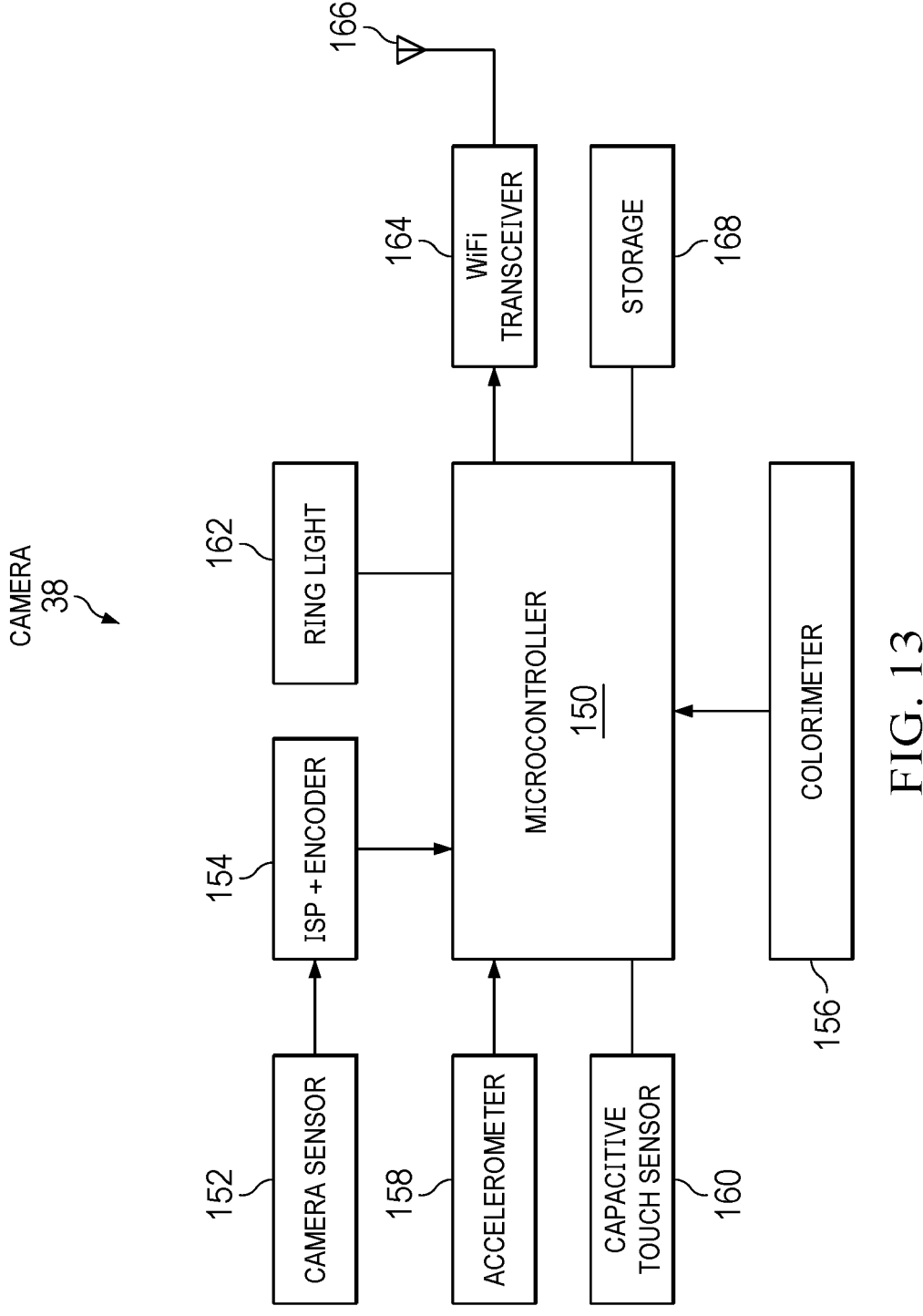
FIG. 13 depicts a logical block diagram of elements of a peripheral camera to accept tap inputs, use a display color palette to locate a camera and adjust display brightness based upon the camera image sensor captured images.

Referring now to FIG. 13, a logical block diagram depicts elements of a peripheral camera 38 to accept tap inputs, use a display color palette to locate a camera and adjust display brightness based upon the camera image sensor captured images. In the example embodiment, peripheral camera 38 includes a microcontroller 150 that executes instructions stored in non-transient memory of a storage 168, such as flash. Microcontroller 150 includes processing resources that manage a camera image sensor 152 and images sensor processor (ISP) plus encoder 154 to perform image capture functions, such as capture of a video stream to support a videoconference and capture of a still picture. An accelerometer 158 interfaces with microcontroller 150 to detect accelerations of the camera, such as a sliding motion across a display to a new position or a rolling motion that indicates a housing free to move. For instance accelerometer 158 includes a gyroscope function that detects orientation of the camera versus orientation of the image sensor. A capacitive touch sensor 160 interfaces with microcontroller 150 to detect touches, such as a touch of the rear magnet against a display and an end user tap that commands capture of a still image to save to storage 168. A WiFi transceiver 164 interfaces with microcontroller 150 to communicate visual information wirelessly from the camera to an information handling system, such as through a WAP, via antenna 166. A colorimeter 156 interfaces with microcontroller 150 to detect colors presented at a display at the location where peripheral camera 38 couples to the display, such as through an opening in the magnet or a side of the magnet. A ring light 162 or similar illumination device provides illumination from peripheral camera 38 towards the image sensor field of view to illuminate a target of the camera. Microcontroller 150 controls ring light 162 based upon ambient light and illumination of the display as described below.

Instructions executing on microcontroller 150 interact with colorimeter and the information handling system to use colors detected from the presentation of the display to determine a location of the camera on the display. As an example, the operating system camera driver commands a presentation of a known color palette at the display and the microcontroller applies colors detected by the colorimeter to locate the camera on the display. In various embodiments, the changes to the display visual image is minor in nature so that the colorimeter detects the changes without substantially changing the visual image in a manner detectable by an end user. In one embodiment, colors presented by the display are determined in part by whether the camera accelerometer detects movement of the camera. For instance, if the camera is stationary, the colorimeter reports the colors detected under the camera so that the display has to only adjust pixels with these color values to determine the location of the camera, such as with subtle changes in display pixel colors and/or brightness in an iterative manner until the camera is located. Alternatively, if the colors detected by the colorimeter are constantly changing, the color changes may be tracked until the camera position is found and verified. In such an embodiment, the accelerometer confirms a lack of motion and the microcontroller communicates detected color changes to the camera driver. When the accelerometer detects changes in position, a comparison may be performed between the colors detected before movement started and the colors detected when movement completes to derive a general position and narrow the search area where display colors are altered to detect the end position.

Referring now to FIG. 14, a flow diagram depicts a process to use a display color palette to locate a camera on a display. The process starts at step 170 with a command to detect the camera position, such as when a videoconference application is initiated. At step 172 a determination is made of whether the camera is moving, such as by an accelerometer or an analysis of visual images captured by the camera. If movement is not detected, the process returns to step 170 to use the existing position. At step 174 a determination is made of whether the display image is static. If not, the process continues to step 176 to temporarily freeze the display buffer image. At step 178, an estimate is made of the potential camera positions or location areas by comparing the image in the display buffer when static against the colors detected by the colorimeter when the display image is static. Once the area of the camera is estimated, the process continues to step 180 to offset color presented in one-half of the subset target area with priority to the top center area where the camera is most likely positioned. The color offset is an amount that is detectable by the colorimeter with minimal changes beyond the detectable amount. Although the top center area is a default area to search initially, in alternative embodiments other factors may be used to start a search location, such as the location of a videoconference window or a historical placement favored by the end user.

Once a subset of area are defined to search and the search is initiated, the images presented by the display are adjusted iteratively until changes in color are detected at the colorimeter. At step 182 a determination is made of whether the camera is located based upon the initial changes to display color. The process detects the camera position when the subset area equal an altered subset color presentation at step 184, and detects that the camera position is different at step 186 when the color detected at the subset area is a non-altered subset area. At step 188 a determination is made of whether the subset area has a value of greater than one, reflecting the unaltered pixel values minus the pixel values detected by the colorimeter. If not, the process returns to step 180 compare against a different subset area. If the difference is greater than one, the process continues to step 190 to identify the display of the subset area as the camera location and then the process ends at step 192.

Figure 15:
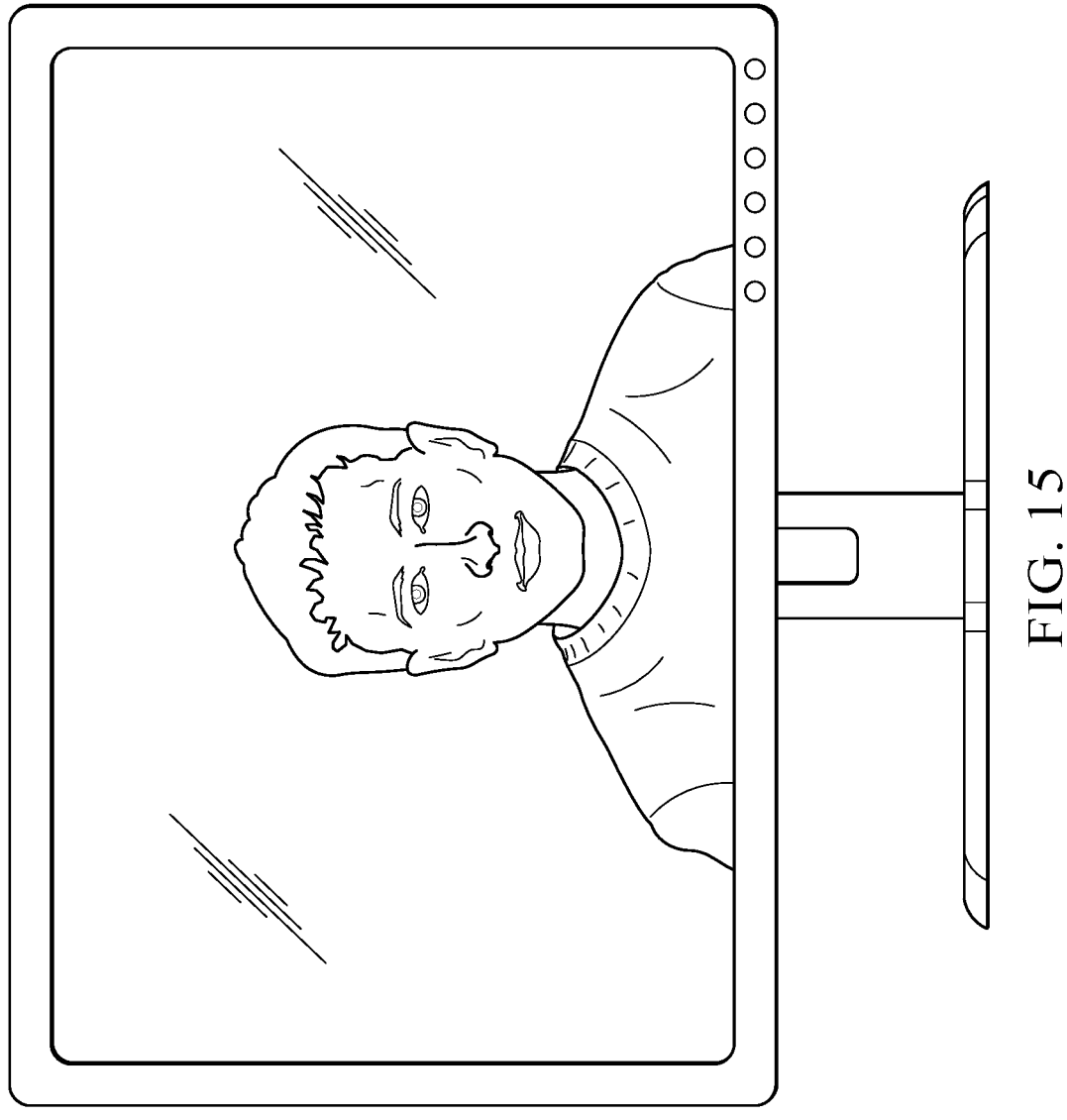
FIG. 15 depicts an example of a display presentation that illustrates gradient lighting that addresses image uniformity.

Referring now to FIG. 15, an example of a display presentation illustrates gradient lighting that addresses image uniformity. Referring back to FIG. 13, a ring light 162 is included around the circumference of peripheral camera 38 cylindrical outer housing to illuminate out from the camera and into the image sensor field of view. In alternative embodiments, the ring light may include a point light at the front camera face, similar to a conventional flash LED, that illuminates directly forward. When the peripheral camera magnetically couples to a display front face, illumination from the ring light helps to illuminate an end user with soft light while not blinding the end user from looking directly into the camera. Instructions on the microcontroller execute to coordinate illumination by the right light so that the image captured of the end user is enhanced while the battery power of the camera is extended as much as possible. In part, the image presented on the display has its brightness adjusted when the camera magnetically couples to the display so that the visual image captured by the camera has a desired quality. When the display image cannot offer sufficient illumination towards the end user, the illumination of the end user is optionally optimized or enhanced with illumination from the ring light. To preserve battery power, illumination by the display is prioritized over illumination by the ring light and can include brightening of presented visual images around the edges of the display panel and outside the boundary of a videoconference window.

In one embodiment, a visual image of an end user face is analyzed locally at the camera detect lighting impacts. For instance, one goal of the logic is to remove or reduce shadows from the end user face and to highlight the end user face relative to the background of the end user. For instance, a video capture in a dark ambient condition could have a large white ring around the perimeter of the display to light the end user face. When the ambient conditions have a greater brightness at one side of the display, the opposite side of the display can present a brighter area, such as a small set of white pixels where the end user face is shadowed. When the display illumination does not provide sufficient illumination of the end user face, the ring light can supplement the illumination based upon the camera position and the relative illumination at the end user face. In one embodiment, the ring light illumination is iteratively adjusted to find an optimal facial illumination profile in combination with changes in illumination at different portions of the display. In another embodiment, different portions of the ring light may illuminate rather than the full circumference. Coordination between display illumination and ring light illumination is managed by the operating system camera driver, which seeks to lengthen battery life of the camera where possible by relying on the display illumination. In one embodiment, the battery of the camera is checked for charge as one of the factors for determining an amount of ring light illumination. In another embodiment, when the portable information handling system is operating on battery, the portable information handling system battery charge state is considered as a factor that overrides concerns related to camera battery charge. In another alternative embodiment, a keyboard backlight of the portable information handling system may be used to adjust illumination, such as when the camera is in an upper part of the display and shadows are detected at the lower portion of the end user face.

Figure 16:
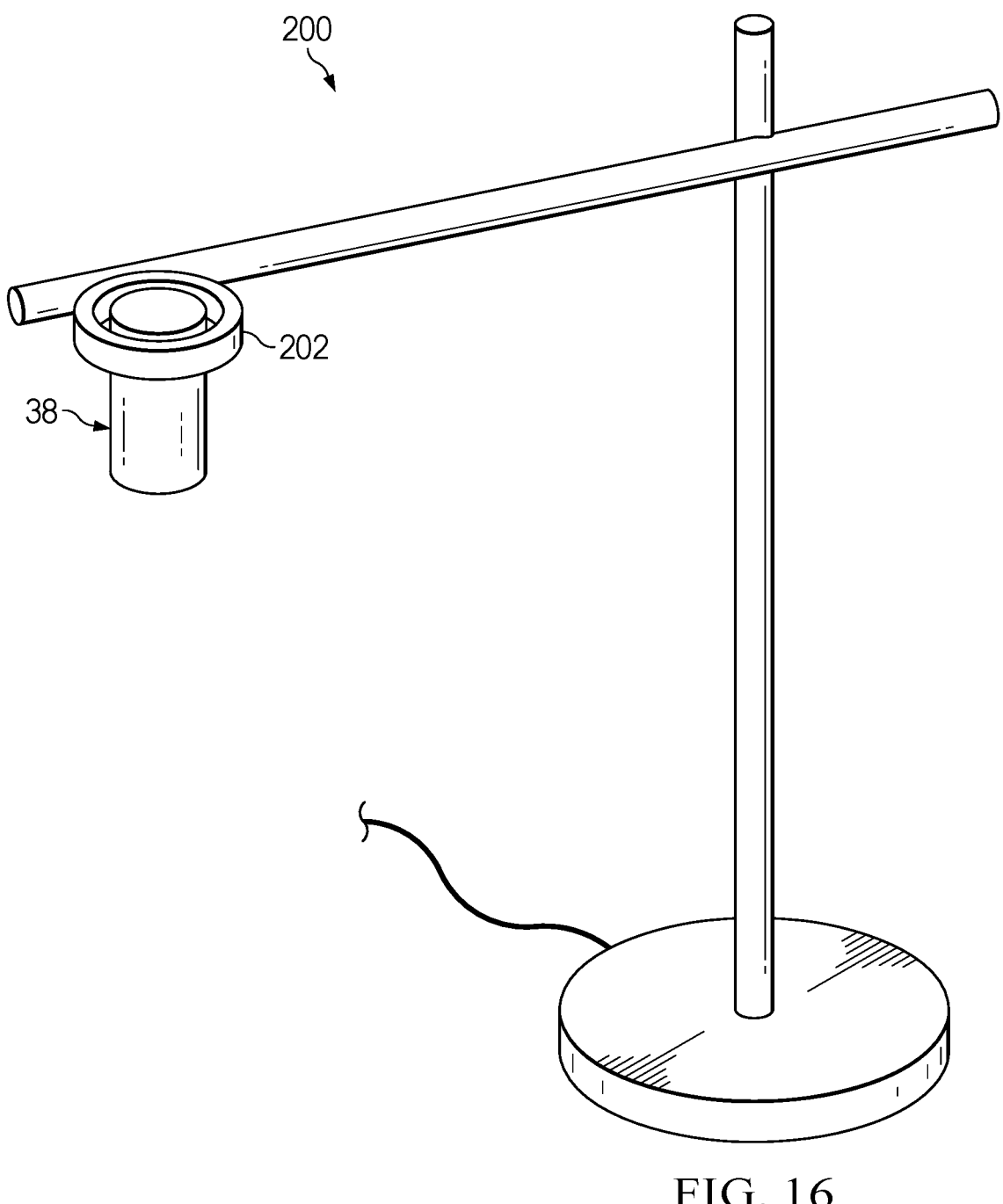
FIG. 16 depicts an example of a stand that holds a peripheral camera above a support surface to capture images.

Referring now to FIG. 16, an example of a stand 200 is depicted that holds a peripheral camera 38 above a support surface to capture images. A spindle 202 extends from a bottom side of an arm of stand 200 and includes ferromagnetic material that attracts to peripheral camera 38 to hold the camera above a desktop surface. In the raised position, peripheral camera 38 captures visual images of documents or handwriting that can be streamed through a video conference. Spindle 202 rotates about the axis of the field of view of the camera so that an end user can rotate peripheral camera 38 to adjust the orientation of captured visual images. In addition, the stand arm rotates to adjust the camera position and spindle 202 slides up and down the stand arm so that the image captured can be adjusted in a rotational orientation around stand 200. The arm also tilts to change the camera height from the support surface. These adjustments in physical positions of the camera support rapid interactive management of what the camera presents during a videoconference.

Figure 17:
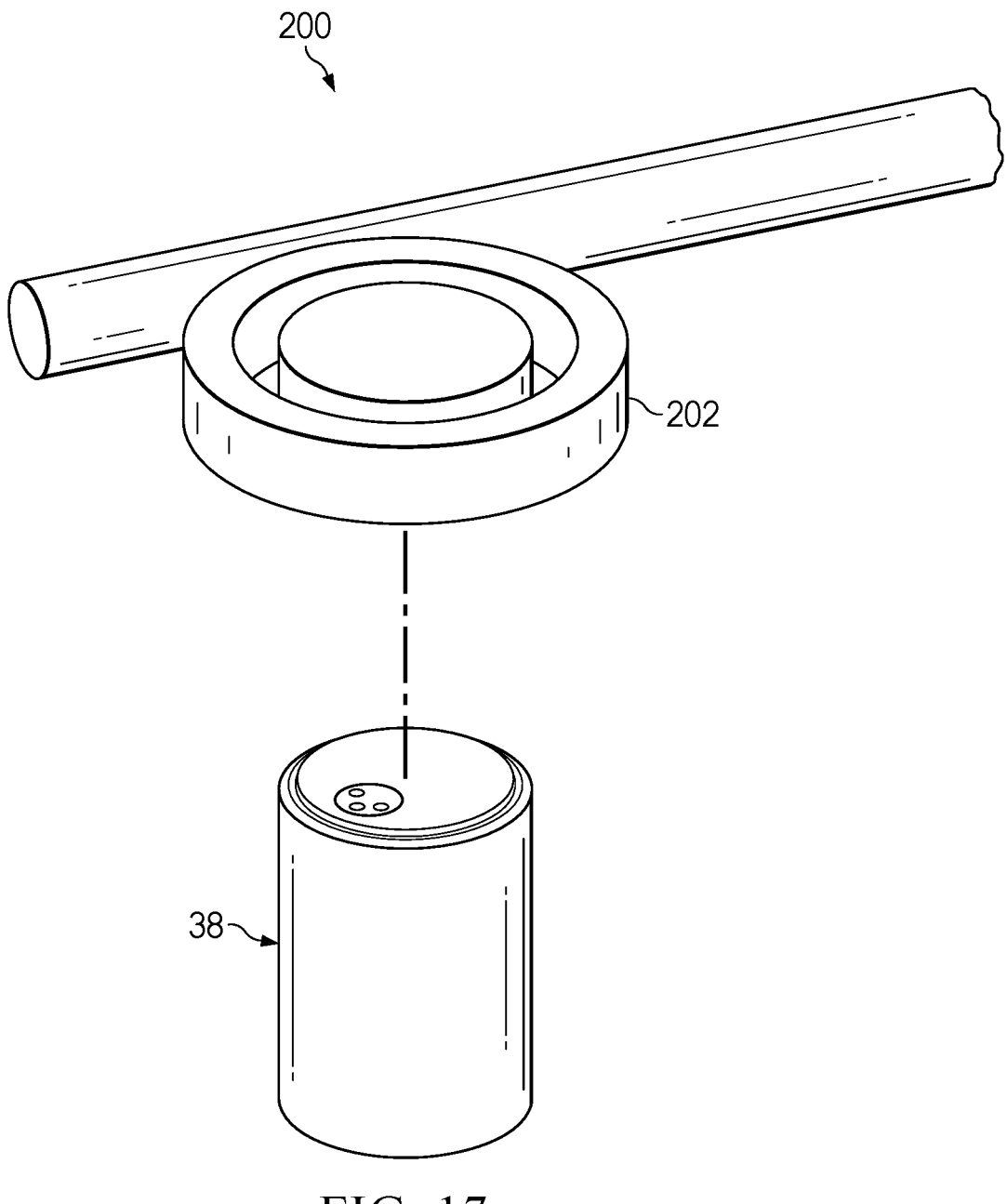
FIG. 17 depicts the camera aligned to couple to the stand to rotate about the coupling axis.

Referring now to FIG. 17, the camera is depicted aligned to couple to the stand to rotate about the coupling axis. Peripheral camera 38 has a magnet at the rear side that couples to spindle 202. An end user participating in a videoconference removes peripheral camera 38 from the display and magnetically attaches it to spindle 202 to capture visual images of documents for discussion. Peripheral camera 38 rotates around spindle 202 so that an end user viewing the camera output can align the documents upright by spinning the spindle. Once the document is captured and upright, the end user can tilt the arm down to get a closer view or zoom in on the document and can slide the spindle along the arm to change the center of the field of view. Mechanical manipulation of the camera position with feedback at the display provides an end user with a powerful tool to involve documents in a videoconference. Once the end user completes the document presentation, the camera is pulled from spindle 202 and placed back on the display to support the videoconference.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions to process information;

a memory disposed in the housing and interfaced with the processor, the memory storing the information and instructions;

a display interfaced with the processor and including at least some ferromagnetic material, the display operable to present the information as visual images;

a peripheral camera separate from the housing and having a camera housing, an image sensor at a first end of the camera housing, a processing resource, a non-transitory memory, a battery and a magnet at a second end of the camera housing, the magnet selectively coupling the peripheral camera to the display by magnetic attraction; and a camera dock configured to charge the peripheral camera when the peripheral camera rests on the camera dock;

wherein the camera non-transitory memory stores instructions that when executed on the camera processing resource cause:

monitoring context when the camera magnetically couples to the display;

streaming video at the full resolution when a first context is detected; and streaming video at a partial resolution when a second context is detected.

2. The information handling system of claim 1 wherein:

the first context comprises a first battery charge and first anticipated time of camera streaming video; and the second context comprises the first battery charge and a second anticipated time of camera streaming video.

3. The information handling system of claim 2 wherein the instructions further stream video at a full resolution when the peripheral camera rests in the dock.

4. The information handling system of claim 3 wherein the instructions further determine anticipated time of camera streaming video based at least in part by reference to a calendar having a videoconference scheduled.

5. The information handling system of claim 3 wherein the instructions further determine anticipated time of camera streaming video based at least in part by reference to historical videoconferences.

6. The information handling system of claim 2 wherein:

the full resolution comprises 4K and 60 frames per second; and the partial resolution comprises 2 k and 30 frames per second.

7. The information handling system of claim 3 further comprising:

a wireless charging transmitter included in the dock; and a wireless charging receiver included in the peripheral camera and aligned to receive charge from the wireless charging transmitter when the camera rests in the dock.

8. The information handling system of claim 3 further comprising:

first and second charging pin extending from the dock to provide charge and ground; and first and second contacts exposed on the peripheral camera to receive the charge and ground when the peripheral camera rests in the dock.

9. The information handling system of claim 8 wherein the first and second contacts comprise concentric conductive rings exposed at the second end of the camera housing.

10. A method for capturing visual images with a peripheral camera at an information handling system, the method comprising:

monitoring context when the peripheral camera captures visual images including at least whether the peripheral camera is docked or undocked;

wirelessly streaming video from the peripheral camera to the information handling system at a full resolution when a first context is detected; and wirelessly streaming video from the peripheral camera to the information handling system at a partial resolution when a second context is detected;

wherein the monitoring context further comprises:

detecting the peripheral camera is docked;

detecting charge communicated from the dock to the peripheral camera; and in response to the dock and charge, determining the first context to wirelessly stream the video at full resolution.

11. The method of claim 10 wherein:

the full resolution comprises 4K and 60 frames per second; and the partial resolution comprises 2 k and 30 frames per second.

12. The method of claim 10 wherein the monitoring context further comprises:

detecting the peripheral camera is undocked;

detecting less than a predetermined charge in a battery of the peripheral camera; and in response to the undocked and the predetermined charge, determining the second context to wirelessly stream the video at partial resolution.

13. The method of claim 12 wherein the monitoring context further comprises:

detecting the peripheral camera is undocked;

detecting greater than a predetermined charge in a battery of the peripheral camera; and in response to the undocked and the predetermined charge, determining the first context to wirelessly stream the video at full resolution.

14. The method of claim 10 wherein the monitoring context further comprises:

detecting the peripheral camera is undocked;

estimating a predetermined time for the peripheral camera to stream video; and in response to the undocked and the estimating, determining the second context to wirelessly stream the video at partial resolution.

15. The method of claim 14 further comprising:

retrieving a scheduled videoconference time from a calendar; and applying the scheduled video conference time to estimate the predetermined time.

16. The method of claim 15 further comprising:

in response to the undocked and the estimating, determining the first context to wirelessly stream the video at the full resolution.

* * * * *